US012750085B2

(12) United States Patent
Chung et al.

(10) Patent No.: US 12,750,085 B2
(45) Date of Patent: Sep. 29, 2026

(54) METHOD AND APPARATUS FOR PERFORMING FULL DUPLEX RADIO IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Jaehoon Chung, Seoul (KR); Byung-Wook Min, Seoul (KR); Jun Hwang, Seoul (KR); Jongpil Lee, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 389 days.

(21) Appl. No.: 18/683,132

(22) PCT Filed: Aug. 19, 2021

(86) PCT No.: PCT/KR2021/011047

§ 371 (c)(1),
(2) Date: Feb. 12, 2024

(87) PCT Pub. No.: WO2023/022262

PCT Pub. Date: Feb. 23, 2023

(65) Prior Publication Data

US 2025/0141489 A1 May 1, 2025

(51) Int. Cl.
*H01P 1/38* (2006.01)
*H04B 1/56* (2006.01)
*H04L 5/14* (2006.01)

(52) U.S. Cl.
CPC ................. *H04B 1/56* (2013.01); *H01P 1/38* (2013.01); *H04L 5/14* (2013.01)

(58) Field of Classification Search
CPC .. H01P 1/38; H01P 1/387; H03K 5/14; H04B 1/00; H04B 1/40; H04B 1/44; H04B 1/56;

(Continued)

(56) References Cited

U.S. PATENT DOCUMENTS 10,804,583 B2 10/2020 Kord et al.
2018/0219269 A1* 8/2018 Wang ...................... H01P 1/397

FOREIGN PATENT DOCUMENTS

KR 101234045 B1 * 2/2013

OTHER PUBLICATIONS

M. Biedka et al. "Full-Duplex RF Front Ends", IEEE, Jan. 11, 2019 (Year: 2019).*

(Continued)

*Primary Examiner* — Shawkat M Ali
(74) *Attorney, Agent, or Firm* — LEE, HONG, DEGERMAN, KANG & WAIMEY

(57) ABSTRACT

A method of transmitting and receiving a signal at a terminal in a wireless communication system may be provided. A method of, at a terminal, transmitting and receiving a signal may comprise generating a first signal at transmitting end of the terminal and transmitting the generated first signal through an antenna and receiving a second signal through the antenna and transferring the second signal to a receiving end of the terminal. A differential circulator may be provided between the transmitting end and receiving end and the antenna, and the first signal may be transmitted and the second signal may be received at the same time based on the differential circulator.

14 Claims, 29 Drawing Sheets

(58) Field of Classification Search
CPC .. H04B 3/00; H04B 7/04; H04B 7/212; H04J 15/00; H04L 5/00; H04L 5/14; H04L 5/22; H04L 25/02
USPC ........ 333/101, 103, 164; 370/229, 282, 297, 370/328; 375/219, 295, 316
See application file for complete search history.

(56) References Cited

OTHER PUBLICATIONS

PCT International Application No. PCT/KR2021/011047, International Search Report dated May 4, 2022, 5 pages.
Nagulu et al., "A Single Antenna Full-Duplex Radio Using a Non-Magnetic, CMOS Circulator with In-built Isolation Tuning," 2019 IEEE International Conference on Communications Workshops (ICC Workshops), May 2019, 7 pages.

* cited by examiner

METHOD AND APPARATUS FOR PERFORMING FULL DUPLEX RADIO IN WIRELESS COMMUNICATION SYSTEM

CROSS-REFERENCE TO RELATED APPLICATION(S)

This application is the National Stage filing under 35 U.S.C. 371 of International Application No. PCT/KR2021/011047, filed on Aug. 19, 2021, the contents of which are all hereby incorporated by reference herein in their entireties.

TECHNICAL FIELD

The following description relates to a wireless communication system and a method and device for performing full duplex radio (FDR).

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a method and device for constructing a circulator for a device performing full duplex radio (FDR) in a wireless communication system.

The present disclosure relates to a method and device for constructing a non-magnetic circulator in a wireless communication system.

The present disclosure relates to a method and device for constructing a differential circulator based on a non-magnetic circulator in a wireless communication system.

The present disclosure relates to a method and device for performing full duplex radio based on operation timing of each switch in a sequentially switched delay line (SSDL) circulator in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method of, at a terminal, transmitting and receiving a signal in a wireless communication system may comprise generating a first signal at transmitting end of the terminal and transmitting the generated first signal through an antenna and receiving a second signal through the antenna and transferring the second signal to a receiving end of the terminal. A differential circulator may be provided between the transmitting end and receiving end and the antenna, and the first signal may be transmitted and the second signal may be received at the same time based on the differential circulator.

As an example of the present disclosure, a terminal for transmitting and receiving a signal in a wireless communication system may comprise a transceiver and a processor connected to the transceiver. The processor may, generate a first signal at a transmitting end of the terminal and transmit the generated first signal through an antenna and receive a second signal through the antenna and transfer the second signal to a receiving end of the terminal. A differential circulator may be provided between the transmitting end and receiving end and the antenna, and the first signal may be transmitted and the second signal may be received at the same time based on the differential circulator.

As an example of the present disclosure, a method of, at a base station, transmitting and receiving a signal in a wireless communication system may comprise generating a first signal at transmitting end of the base station and transmitting the generated first signal through an antenna and receiving a second signal through the antenna and transferring the second signal to a receiving end of the base station. A differential circulator may be provided between the transmitting end and receiving end and the antenna, and the first signal may be transmitted and the second signal may be received at the same time based on the differential circulator.

As an example of the present disclosure, a base station for transmitting and receiving a signal in a wireless communication system may comprise a transceiver and a processor connected to the transceiver. The processor may, generate a first signal at a transmitting end of the base station and transmit the generated first signal through an antenna and receive a second signal through the antenna and transfer the second signal to a receiving end of the base station. A differential circulator may be provided between the transmitting end and receiving end and the antenna, and the first signal may be transmitted and the second signal may be received at the same time based on the differential circulator.

As an example of the present disclosure, a device may comprise at least one memory and at least one processor functionally connected to the at least one memory. The at least one processor may cause the device to, generate a first signal at a transmitting end of the device and transmit the generated first signal through an antenna and receive a second signal through the antenna and transfer the second signal to a receiving end of the device. A differential circulator may be provided between the transmitting end and receiving end and the antenna, and the first signal may be transmitted and the second signal may be received at the same time based on the differential circulator.

As an example of the present disclosure, a non-transitory computer-readable medium storing at least one instruction may comprise the at least one instruction executable by a processor. The at least one instruction may cause a device to generate a first signal at a transmitting end of the device and transmit the generated first signal through an antenna and receive a second signal through the antenna and transfer the second signal to a receiving end of the device. A differential circulator may be provided between the transmitting end and receiving end and the antenna, and the first signal may be transmitted and the second signal may be received at the same time based on the differential circulator.

The following is commonly applicable.

As an example of the present disclosure, the differential circulator may be a differential sequentially switched delay line (SSDL) circulator comprising contiguous switches and delay lines.

As an example of the present disclosure, the differential SSDL circulator may comprise two double pole double throw (DPDT) switches and two single pole double throw (SPDT) switches, and a delay line may be configured between the two DPDT switches and the two SPDT switches.

As an example of the present disclosure, the delay line may be configured based on a magnetically coupled inductor.

As an example of the present disclosure, each of the two DPDT switches may comprise two input terminals and two output terminals, and the two input terminals of each of the two DPDT switches may be respectively connected to the transmitting end and the receiving end, and the two output terminals of each of the two DPDT switches may be connected to the delay line configured based on the magnetically coupled inductor.

As an example of the present disclosure, each of the two SPDT switches may comprise one input terminal and two output terminals, the two output terminals of each of the two SPDT switches may be connected to the delay line configured based on the magnetically coupled inductor, and the input terminal of each of the two SPDT switches may be connected to the antenna.

As an example of the present disclosure, each of the two SPDT switches may be switched from a first output terminal to a second output terminal at a first timing.

As an example of the present disclosure, each of the two input terminals of each of the two DPDT switches may be switched from a first input terminal to a second input terminal at a second timing later than the first timing As an example of the present disclosure, each of the two SPDT switches may be switched from the second output terminal to the first output terminal at a third timing later than the second timing.

As an example of the present disclosure, each of the two input terminals of each of the two DPDT switches may be switched from the second input terminal to the first input terminal at a fourth timing later than the third timing.

As an example of the present disclosure, the first signal generated at the transmitting end may be generated based on a first frequency, and the first signal based on the first frequency may pass through the two DPDT switches and then pass through the delay line based on a signal with a mixed frequency component, and when the signal with the mixed frequency component passes through the two SPDP switches, the first signal based on the first frequency may be restored.

As an example of the present disclosure, the delay line configured based on the magnetically coupled inductor may comprise a direct capacitor and a cross capacitor, and the direct capacitor may have a frequency at which delay of the delay line increases, and the cross capacitor may have a frequency at which the delay of the delay line decreases.

The above-described aspects of the present disclosure are only some of the preferred embodiments of the present disclosure, and various embodiments reflecting the technical features of the present disclosure may be derived and understood by those of ordinary skill in the art based on the detailed description of the present disclosure.

As is apparent from the above description, the embodiments of the present disclosure have the following effects.

According to the present disclosure, it is possible to provide a method of constructing a circulator for a device performing full duplex radio (FDR) in a wireless communication system.

According to the present disclosure, it is possible to provide a method of constructing a non-magnetic circulator in a wireless communication system.

According to the present disclosure, it is possible to provide a method of constructing a differential circulator based on a non-magnetic circulator in a wireless communication system.

According to the present disclosure, it is possible to provide a method of performing full duplex radio based on operation timing of each switch in a sequentially switched delay line (SSDL) circulator in a wireless communication system.

It will be appreciated by persons skilled in the art that that the effects that can be achieved through the embodiments of the present disclosure are not limited to those described above and other advantageous effects of the present disclosure will be more clearly understood from the following detailed description.

That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
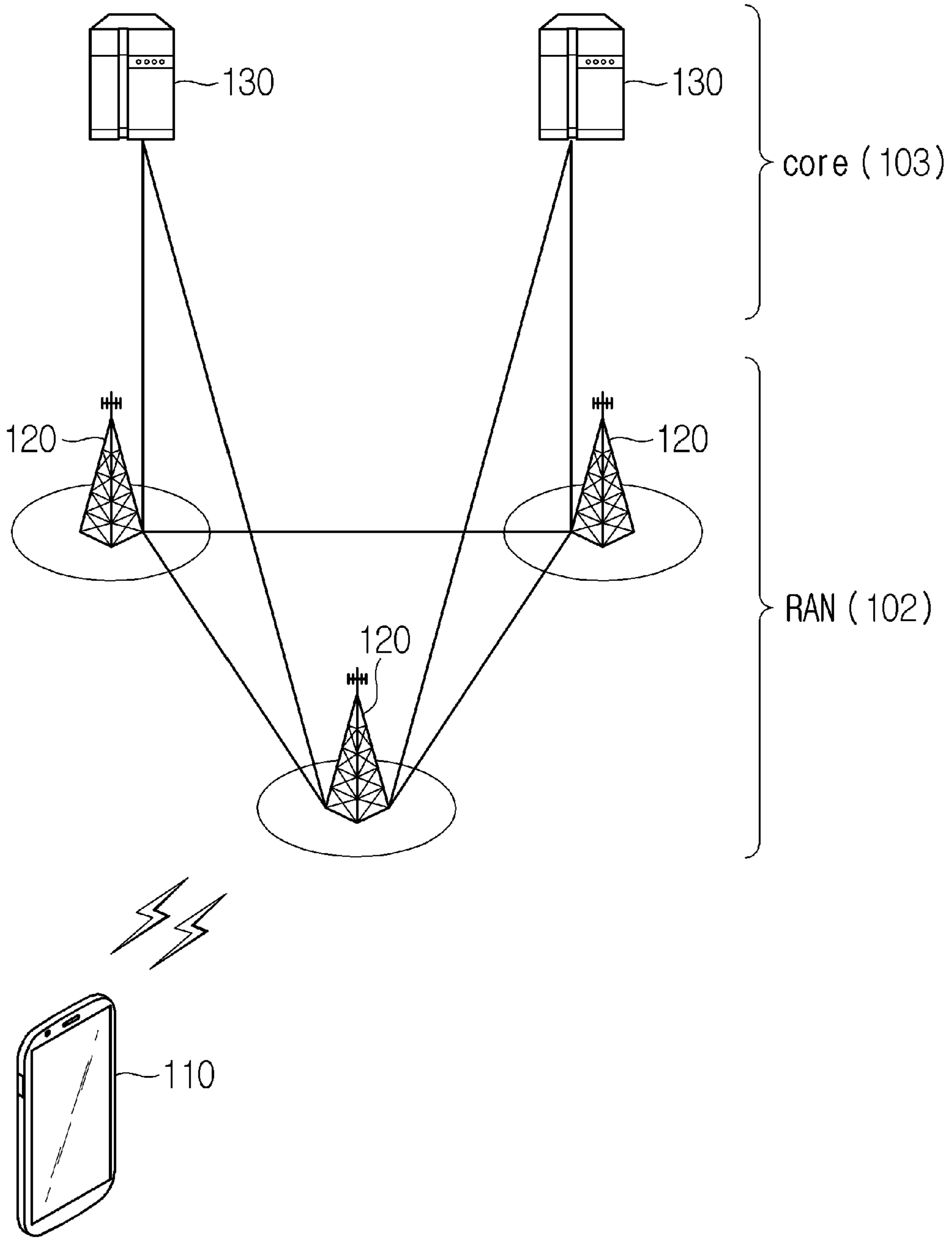
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A, "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if or in case of" may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, 3GPP TS36.XXX, 3GPP TS37.XXX, and TS38.XXX documents may be referenced.

Communication System Applicable to the Present Disclosure

FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a terminal 110 with a control plane and a user plane. The terminal 110 may be fixed or mobile and may be referred to as the other term such as user equipment (UE), mobile station (MS), subscriber station (SS), mobile subscriber station (MSS), mobile terminal or advanced mobile station (AMS), wireless device or the like. The base station 120 is a node for providing a radio access service to the terminal 110 and may be referred to as the other term such as a fixed station, a Node B, a eNode B (eNB), a gNode B (gNB), a ng-eNB, an advanced base station (ABS) or an access point (AP), a base transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the terminal or information on the capabilities of the terminal, and such information is mainly used for mobility management of the terminal. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a terminal unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Radio Resource Structure

Figure 2:
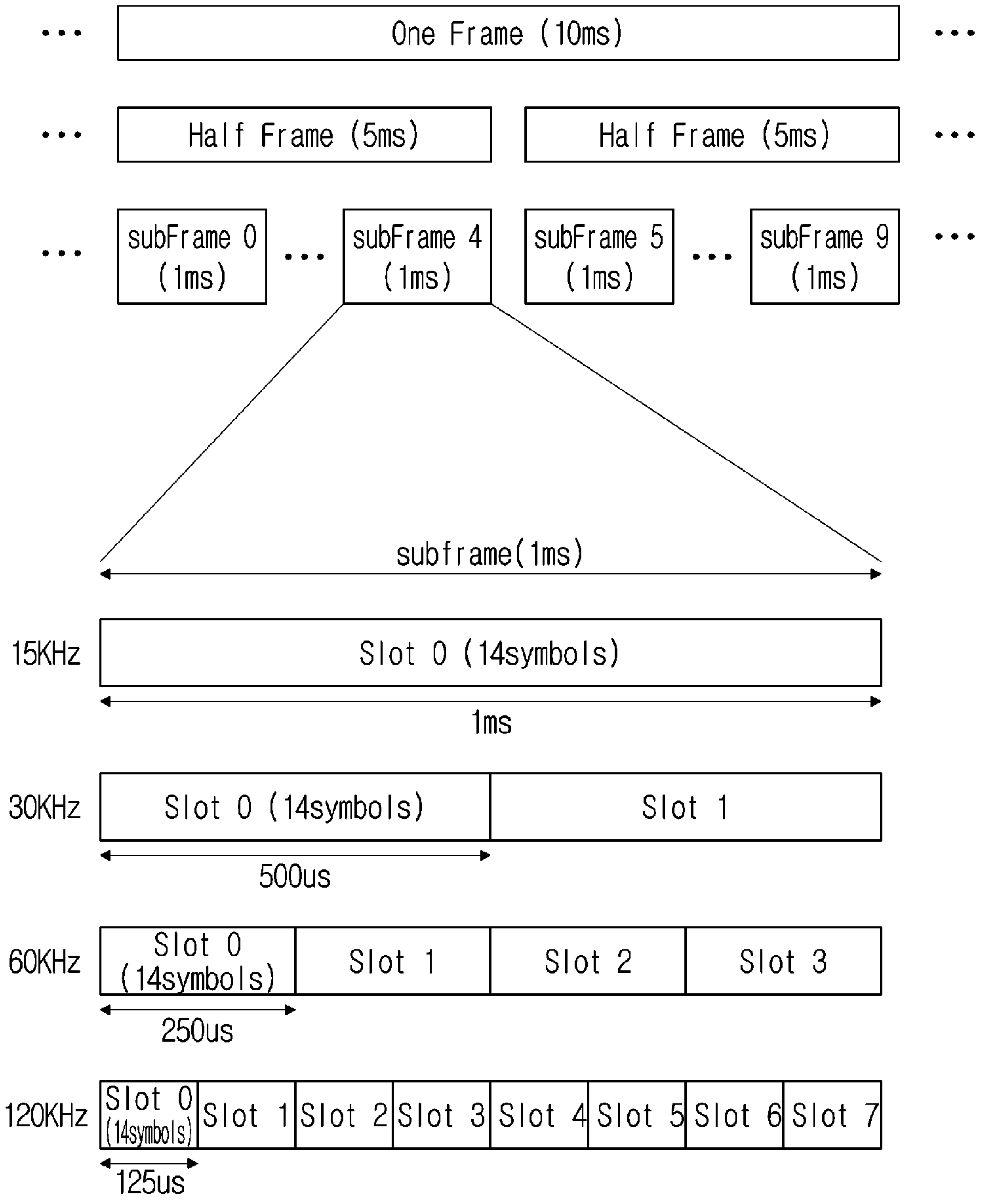
FIG. 2 illustrates the structure of a radio frame of NR according to an embodiment of the present disclosure.

FIG. 2 illustrates the structure of a radio frame of NR according to an embodiment of the present disclosure. The embodiment of FIG. 2 may be combined with various embodiments of the present disclosure.

Referring to FIG. 2, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM (A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier—FDMA) symbol (or a DFT-s-OFDM (Discrete Fourier Transform-spread-OFDM) symbol).

When the normal CP is used, the number $N^{slot}_{symb}$ of symbols per slot, the number $N^{frame,u}_{slot}$ of slots per frame and the number $N^{subframe,u}_{slot}$ of slots per subframe may vary according to the SCS configuration (u). For example, SCS (=15*24), $N^{slot}_{symb}$, $N^{frame,\mu}_{slot}$, and $N^{subframe,\mu}_{slot}$ may be 15 KHz, 14, 10 and 1 in the case of u=0, may be 30 KHz, 14, 20 and 2 in the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS(=15*24), $N^{slot}_{symb}$, $N^{frame,\mu}_{slot}$, and $N^{subframe,\mu}_{slot}$ may be 60 KHz, 12, 40 and 4 in the case of u=2. In the NR system, an OFDM (A) numerology (e.g., SCS, CP length, etc.) may be differently set among a plurality of cells merged into one terminal. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHZ. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHZ, etc.) or higher. For example, a frequency band of 6 GHZ (or 5850, 5900, 5925 MHZ, etc.) included in FR1 may include an unlicensed band. The unlicensed band may be used for various purposes and may be used, for example, for vehicle communication (e.g., autonomous driving).

Figure 3:
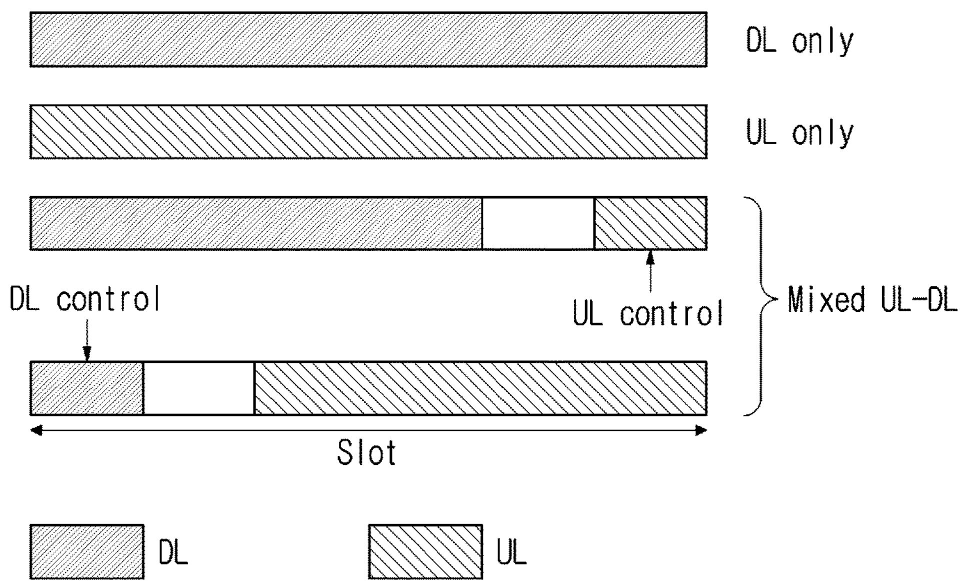
FIG. 3 illustrates the structure of a self-contained slot according to an embodiment of the present disclosure.

FIG. 3 illustrates the structure of a self-contained slot according to an embodiment of the present disclosure.

In the NR system, a frame is characterized by a self-contained structure in which a DL control channel, DL or UL data, a UL control channel, etc. may all be included in one slot. For example, the first N symbols in the slot may be used to transmit a DL control channel (hereinafter referred to as a DL control region) and the last M symbols in the slot may be used to transmit a UL control channel (hereinafter referred to as a UL control region). N and M are integers of 0 or more. A resource region (hereinafter referred to as a data region) between a DL control region and a UL control region may be used for DL data transmission or UL data transmission. For example, the following configurations may be considered.

Durations was listed in chronological order.

1. DL only configuration
2. UL only configuration
3. Mixed UL-DL configuration
   DL region+GP (Guard Period)+UL control region
   DL control region+GP+UL region DL region: (i) DL data region, (ii) DL control region+DL data region UL region: (i) UL data region, (ii) UL data region+UL control region A PDCCH may be transmitted in the DL control region and a PDSCH may be transmitted in the DL data region. A PUCCH may be transmitted in the UL control region and a PUSCH may be transmitted in the UL data region. In the PDCCH, DCI (Downlink Control Information), for example, DL data scheduling information, UL data scheduling information, etc. may be transmitted. In the PUCCH, UCI, for example, ACK/NACK (Positive Acknowledgement/Negative Acknowledgement) information related to DL data, CSI (Channel State Information) information, SR (Scheduling Request), etc. may be transmitted. The GP provides a time gap in a process of switching a transmission mode to a reception mode or switching from a reception mode to a transmission mode in a base station (BS) and a UE. Some symbols at a point in time when DL is switched to UL within the subframe may be set as a GP.

Overview of FDR System and Interference Element in FDR

The FDR system enables simultaneous transmission and reception of uplink and downlink signals on the same frequency band. Accordingly, the FDR system may increase spectral efficiency up to two times that of the existing system for transmitting and receiving uplink and downlink signals by dividing a frequency or time and thus is being spotlighted as one of the core technologies of a next-generation mobile communication system.

From the viewpoint of any wireless device, an FDR technology using a single frequency transmission band may be defined as a transmission resource configuration method of simultaneously performing transmission and reception through a single frequency transmission band. As a special example thereof, the FDR technology may be represented as a transmission resource configuration method of simultaneously performing, for wireless communication between a general access node (e.g., a base station, a repeater, a relay node, a remote radio head (RRH), etc.) and a wireless terminal, downlink transmission and uplink reception of the base station and downlink reception and uplink transmission of the wireless UE through a single frequency transmission band. As another example, the FDR technology may be represented as a transmission resource configuration method of simultaneously performing transmission and reception between wireless UEs in the same frequency transmission band in a situation of device-to-device direct communication (D2D) between wireless UEs.

Hereinafter, although the present disclosure describes proposed technologies related to FDR such as wireless transmission and reception between a general base station and a wireless UE, various proposed embodiments are applicable to a network wireless device for performing wireless transmission and reception with a UE other than a general base station and direct UE-to-UE communication between UEs.

Figure 4:
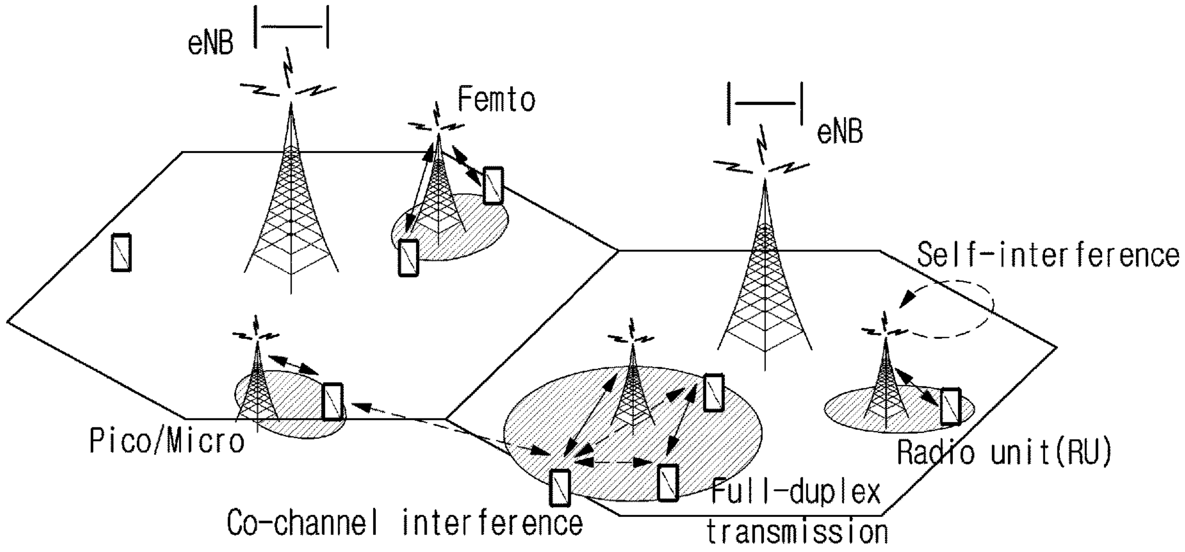
FIG. 4 illustrates the concept of a user equipment (UE) and a base station supporting full duplex radio (FDR) according to an embodiment of the present disclosure.
Figure 9:
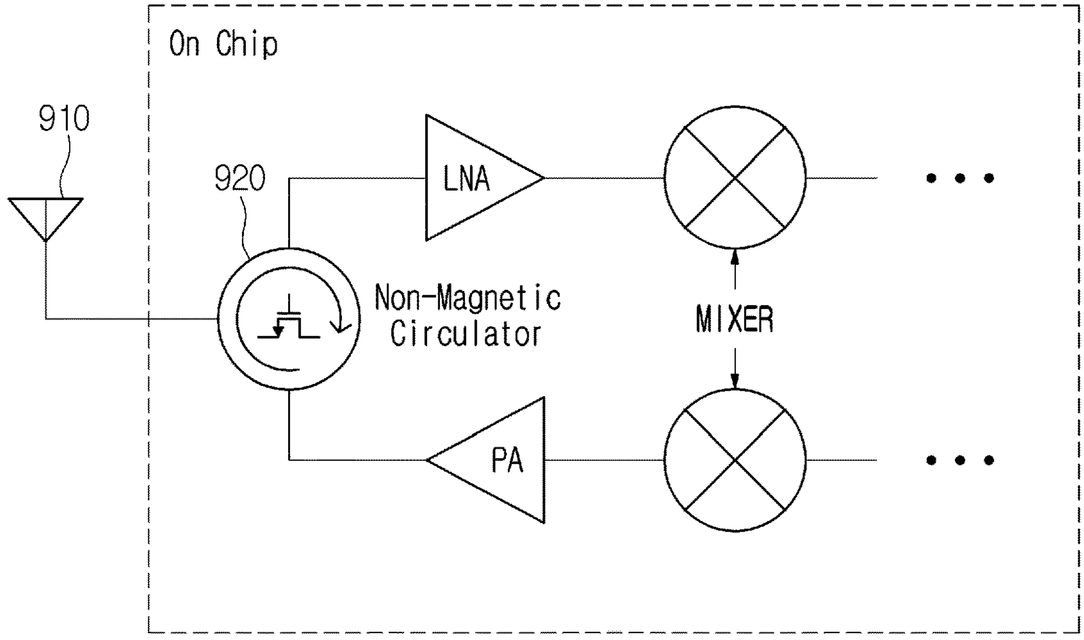
FIG. 9 is a diagram showing a non-magnetic material-based circulator according to an embodiment of the present disclosure.

FIG. 4 illustrates the concept of a user equipment (UE) and a base station supporting full duplex radio (FDR) according to an embodiment of the present disclosure. In the FDR situation shown in FIG. 9, there may be a total of three types of interference as follows.

Intra-device self-interference: Since transmission and reception are performed using the same time and frequency resources, a device simultaneously receives not only a desired signal but also a signal transmitted by the device. In this case, the signal transmitted by the device is received by a receive antenna of the device with little attenuation and thus is received with much greater power than the desired signal, thereby acting as interference.

UE to UE inter-link interference: This means that an uplink signal transmitted by a UE is received by an adjacent UE, thereby acting as interference.

BS to BS inter-link interference: This means that a signal transmitted between BSs or heterogenous base stations (e.g., a picocell, a femtocell or a relay node) in a HetNet situation is received by a receive antenna of another base station, thereby acting as interference.

Among the above three types of interference, intra-device self-interference (SI) occurs only in the FDR system. The SI greatly degrades performance of the FDR system, which is treated as a first problem to be solved in order to operate the FDR system.

Figure 5:
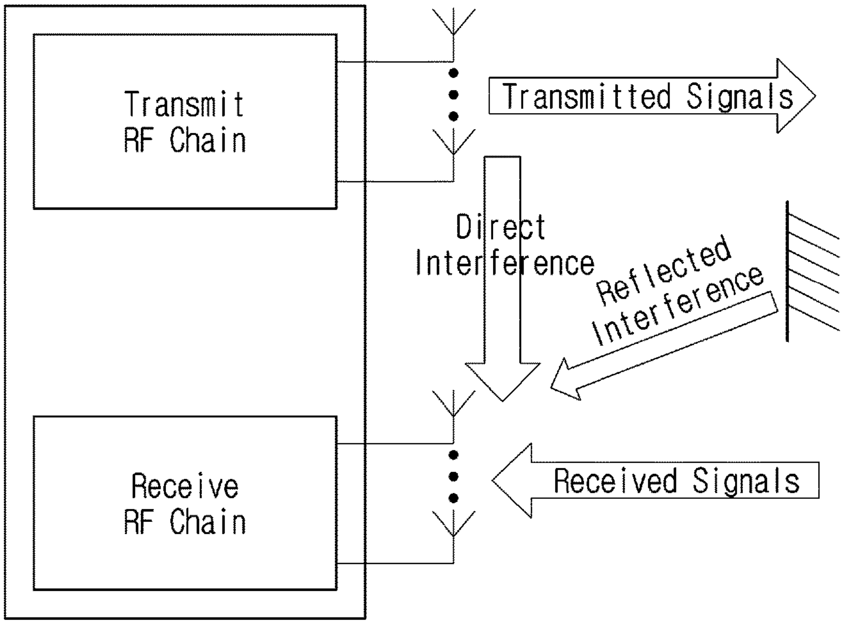
FIG. 5 illustrates an example of transmit/receive link and self-interference in a FDR communication situation according to an embodiment of the present disclosure.

FIG. 5 illustrates an example of transmit/receive link and self-interference in a FDR communication situation according to an embodiment of the present disclosure.

As shown in FIG. 5, SI may be classified into direct interference in which a signal transmitted by a transmit antenna directly enters a receive antenna without path attenuation and reflected interference reflected by a surrounding terrain. The intensity of the direct interference and the reflected interference is generally greater than that of the desired signal because of a difference in physical distance. Due to such a large intensity of interference, effective cancellation of SI is essential for operating the FDR system.

In order to efficiently operate the FDR system, requirements of self-interference cancellation (self-IC) according to maximum transmit power may be determined as shown in Table 1 below.

TABLE 1

| Node Type | Max. Tx Power ($P_A$) | Thermal Noise (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

According to the bandwidth of a mobile communication system, a thermal noise value may be determined by $N_{0,BW}$=−174 dBm+10×log$_{10}$(BW), and Table 1 shows thermal noise on the assumption of bandwidth of 20 MHz. A receiver noise figure (NF) is an example of considering the worst case of the 3GPP standard requirements. A receiver thermal noise level may be determined by a sum of thermal noise in specific BW and receiver NF.

Referring to Table 1, it can be seen that self-interference cancellation performance of 119 dBm is required in order for a UE to efficiently drive the FDR system in bandwidth of 20 MHz. In order to obtain such self-interference cancellation performance, there are a total of three steps of self-interference cancellation techniques, which will be described below in detail.

Antenna Self-IC:

This is a technique to be preferentially executed among all self-interference cancellation techniques, and SI cancellation is performed at an antenna end. As a simplest way, a material capable of blocking signals between transmit and receive antennas may be installed to physically block transmission of an SI signal, a distance between antennas may be intendedly controlled using multiple antennas or the phase of a specific transmitted signal may be inverted to cancel some SI signals. In addition, some SI signals may be canceled using a multi-polarized antenna or a directional antenna.

Analog Self-IC:

This is a technique that cancels interference at an analog end before a received signal passes through an analog-to-digital converter (ADC) and cancels SI signals using a duplicated analog signal. This may be performed in an RF domain or an IF domain.

A method of cancelling an SI signal will be described below in detail. A transmitted analog signal is delayed in time and then a duplicated signal of the actually received SI signal may be generated by adjusting a magnitude and a phase thereof, and subtracted from a signal received by a receive antenna. However, since processing is performed using the analog signal, additional distortion may occur due to implementation complexity and circuit characteristics, thereby greatly changing interference cancellation performance.

Digital Self-IC:

This is a technique that cancels interference after a received signal passes through an ADC and includes all interference cancellation techniques performed in a baseband domain. As a simplest way, a duplicated signal of SI may be generated using a transmitted digital signal and subtracted from a received digital signal. Alternatively, techniques for preventing a signal transmitted by a UE or a base station from being received by a receive antenna by performing precoding/postcoding in the baseband using multiple antennas may also be classified as digital self-interference cancellation.

However, since digital self-interference cancellation is feasible when a digitally modulated signal is quantized enough to restore information on a desired signal, there is a need for a precondition that a difference in signal power level between an interference signal remaining after cancelling interference using one or more of the above-described techniques and the desired signals is within an ADC range.

Figure 6:
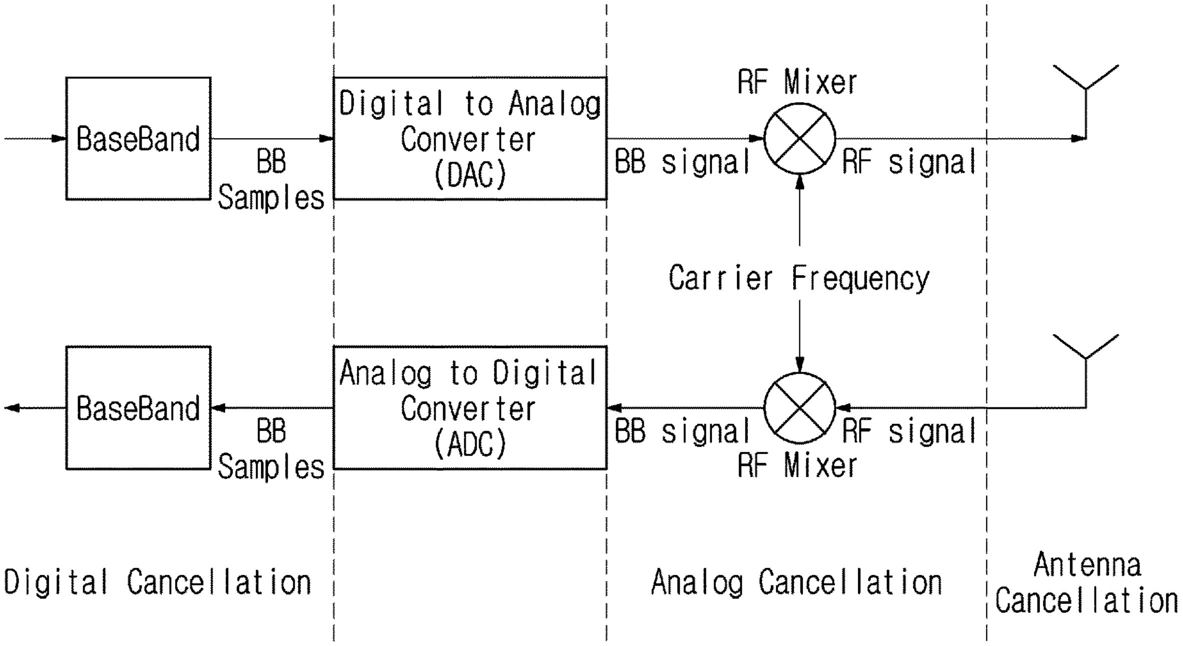
FIG. 6 illustrates a position, to which three interference techniques at a radio frequency (RF) front end is applied, according to an embodiment of the present disclosure.

Positions, to which the above-described three self-interference cancellation techniques are applied, are shown in FIG. 6. FIG. 6 illustrates positions, to which three interference techniques at a radio frequency (RF) front end is applied, according to an embodiment of the present disclosure. Referring to FIG. 6, antenna cancellation for performing antenna self-interference cancellation is applied to an antenna section, analog cancellation for performing analog self-interference cancellation is applied to a section including a mixer for converting a baseband signal into an RF signal, and digital cancellation for performing digital self-interference cancellation is applied to a section before digital-to-analog converter (DAC) input and after ADC output.

Figure 7:
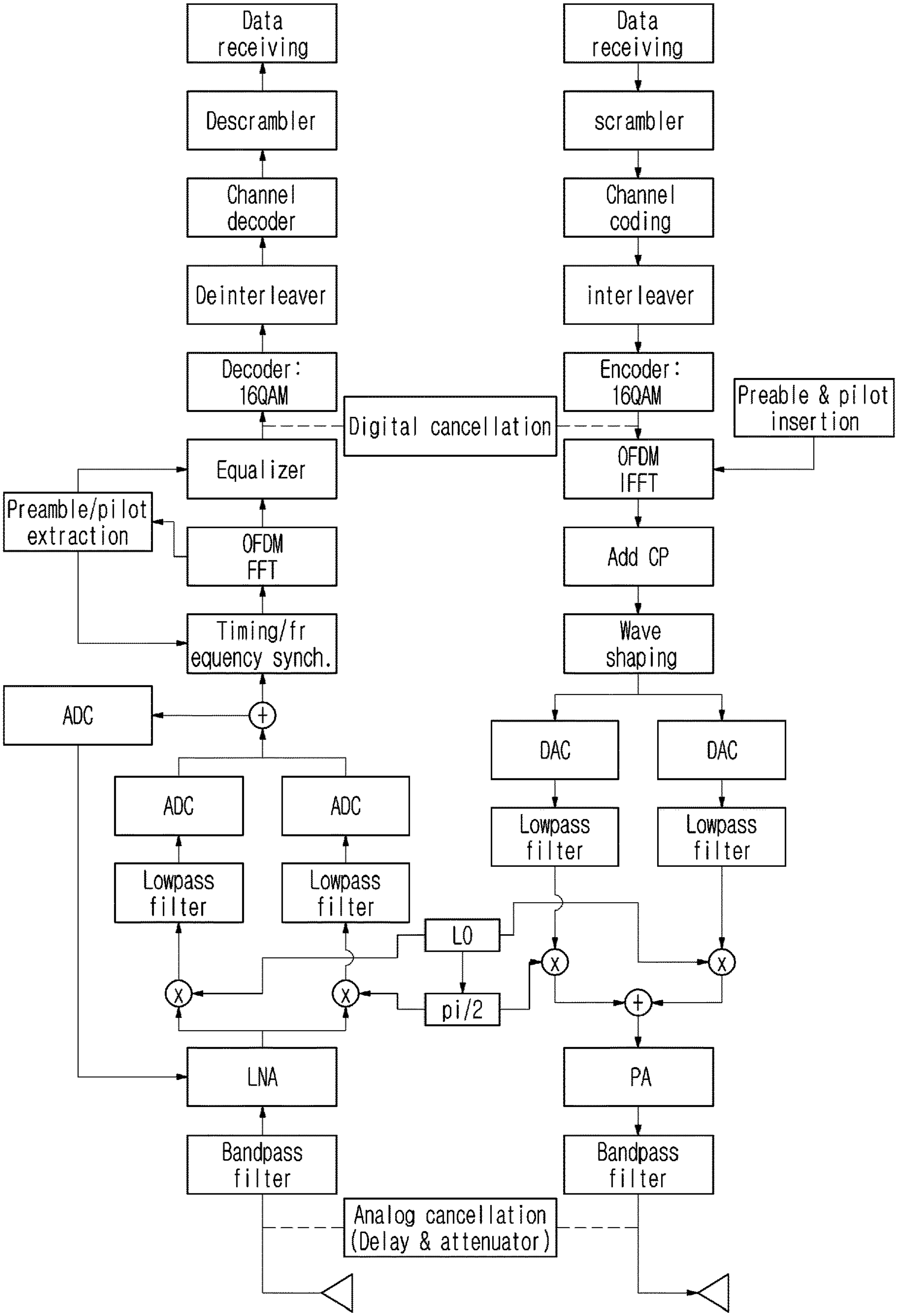
FIG. 7 illustrates the structure of a transceiver for self-interference cancellation in a communication device according to an embodiment of the present disclosure.

FIG. 7 illustrates the structure of a transceiver for self-interference cancellation in a communication device according to an embodiment of the present disclosure. In FIG. 7, a digital cancellation block for performing digital self-interference cancellation performs interference cancellation using digital self-interference signal (digital SI) before the DAC and after passing through the ADC. However, in another example, digital self-interference cancellation may be performed using a digital self-interference signal after passing through an IFFT and before passing through an FFT. In addition, although FIG. 7 shows a structure for canceling a self-interference signal by separating a transmit antenna and a receiver antenna, an antenna interference cancellation technique using one antenna may be used in another example. In this case, the antenna structure may be different from the example of FIG. 7. To this end, a function block suitable for a purpose may be further added or deleted.

Signal Modeling of FDR System

The FDR system uses the same frequency between the transmitted signal and the received signal and thus are greatly affected by non-linear components in RF. In particular, the transmitted signal may be distorted by the non-linear characteristics of active elements such as the power amplifier of a transmit RF chain and a low noise amplifier (LNA) of a receive RF chain, and distortion may also be caused by a mixer in the transmit and receive RF chains. Due to such distortion, the transmitted signal may be modeled as generating a high-order component. Among them, an even-order component is generated around direct current (DC) and in a high frequency region corresponding to several times a center frequency and thus may be efficiently removed using an existing alternative current (AC) coupling or filtering technique. However, an odd-order component is generated adjacent to an existing center frequency and is not easily removed, unlike the even-order component, thereby having great influence upon reception. In consideration of the non-linear characteristics of the odd-order component, the received signal after the ADC in the FDR system is expressed using a parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[equation 1]}$$

In Equation 1, y(n) denotes a received signal, $h_D(n)$ denotes a channel experienced by desired data, $x_D(n)$ denotes desired data to be received, $h_{SL,k}(n)$ denotes a self-channel experienced by transmitted data, $X_{SI}(n)$ denotes transmitted data, and z(n) denotes additive white gaussian noise (AWGN). $h_{SI,k}(n)$ is a linear component when k is 1 and is a non-linear component when k is an odd number of 3 or more.

In order to cancel the above-described analog or digital self-interference, it is necessary to estimate a self-channel. In this case, a received signal after performing self-interference cancellation using gain of the estimated analog or digital self-channel may be expressed as shown in Equation 2 below.

$$y_{Self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)}_{Residual\ SI}, \quad \text{[equation 2]}$$

In Equation 2, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $X_{SI}(n)$ denotes transmitted data, and z(n) denotes AWGN.

Thereafter, a result of decoding the received signal using the gain of the estimated desired channel is shown in Equation 3 below.

[equation 3]

$$\frac{\hat{h}_D(n) y_{Self-IC}(n)}{|\hat{h}_D^*(n)|^2} =$$

$$\frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2} = x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

$$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)$$

$$e(n) = h_D(n) - \hat{h}_D(n)$$

In Equation 3, $\hat{h}_D(n)$ denotes an estimated desired channel, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $X_{SI}(n)$ denotes transmitted data, and z(n) denotes AWGN.

Detailed Embodiments of the Present Disclosure

Figure 8:
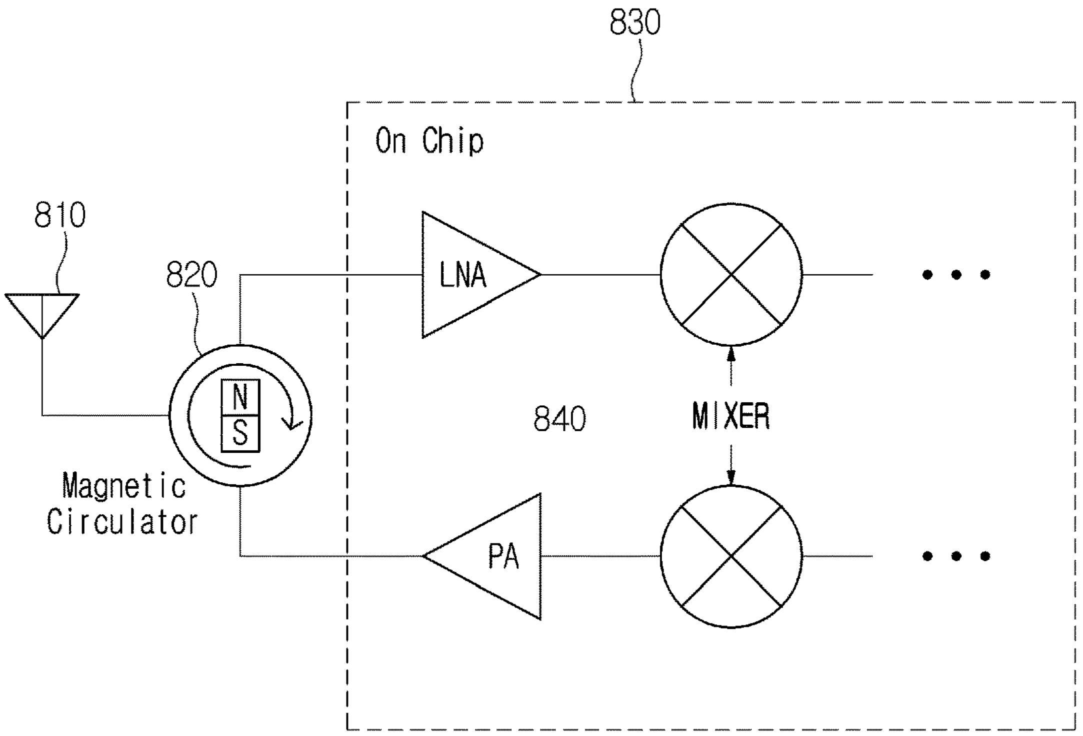
FIG. 8 is a diagram showing a magnetic material-based circulator according to an embodiment of the present disclosure.

In the following, a circulator applicable to a terminal operating based on FDR will be described. For example, a circulator may be provided in a terminal, and a terminal equipped with a circulator may simultaneously perform transmission and reception through a single antenna. At this time, as an example, referring to FIG. 8, the terminal may perform full duplex radio using a magnetic circulator 820 between an antenna 810 and a chipset 830. However, when a terminal is configured using a magnetic circulator, integration of the terminal may not be easy. In other words, there may be limits in integration due to the magnetic material, and a circuit composed of a non-integrated circulator may be expensive and large in size. In consideration of the above, referring to FIG. 9, the terminal configures a communication circuit through an antenna 910 and a circulator (non-magnetic circulator) 920 that does not use a magnetic material, and may perform full duplex radio through this. At this time, the circulator 920 that does not use the magnetic material may be easier to be integrated than a circulator using a magnetic material, and may implement a communication circuit in a small size, thereby increasing the possibility of utilization.

In addition, as an example, when a terminal equipped with a circulator that does not use a magnetic material performs full duplex radio, the terminal needs to transmit a transmission signal while simultaneously receiving a reception signal. At this time, since the circulator does not use a magnetic material, it is necessary to operate based on switching between the antenna and the chipset, through which it is possible to receive a signal and transmit a signal at the same time. Specifically, the circulator may be based on a sequentially switched delay line (SSDL), and may perform full duplex radio by setting operation timing of each switch differently.

Figure 10:
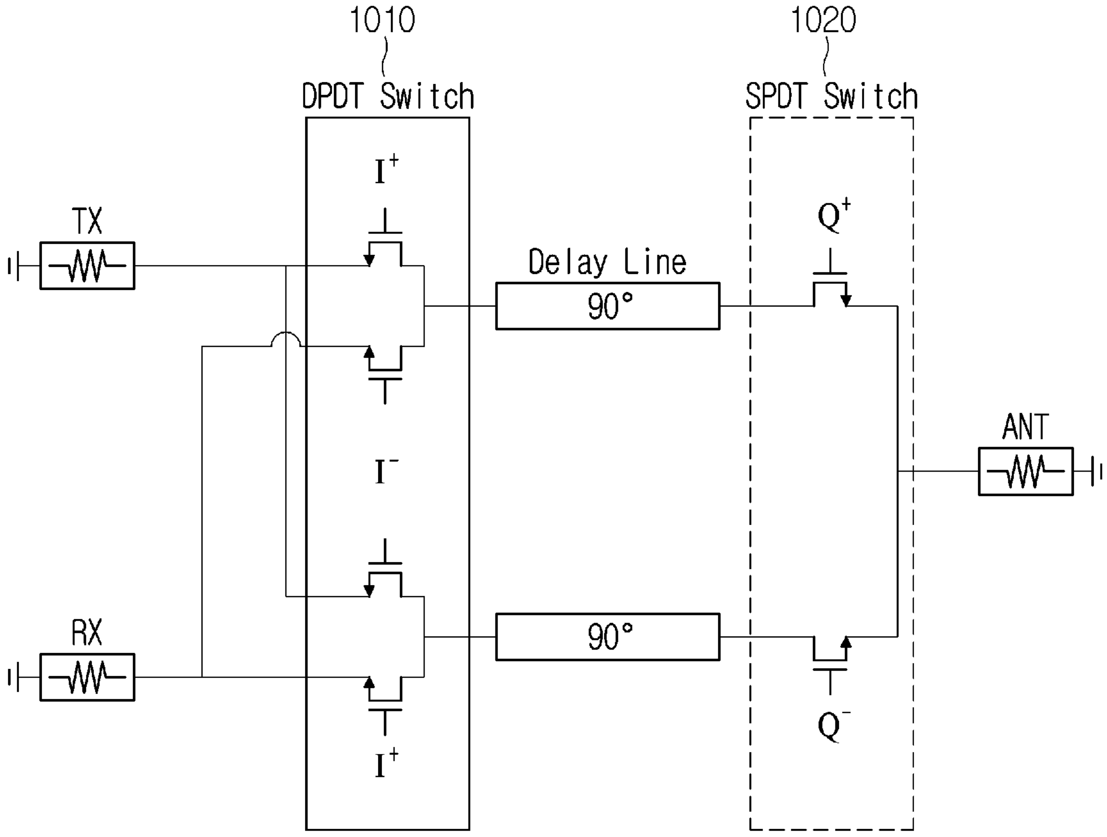
FIG. 10 is a diagram showing a circulator according to an embodiment of the present disclosure.
Figure 11:
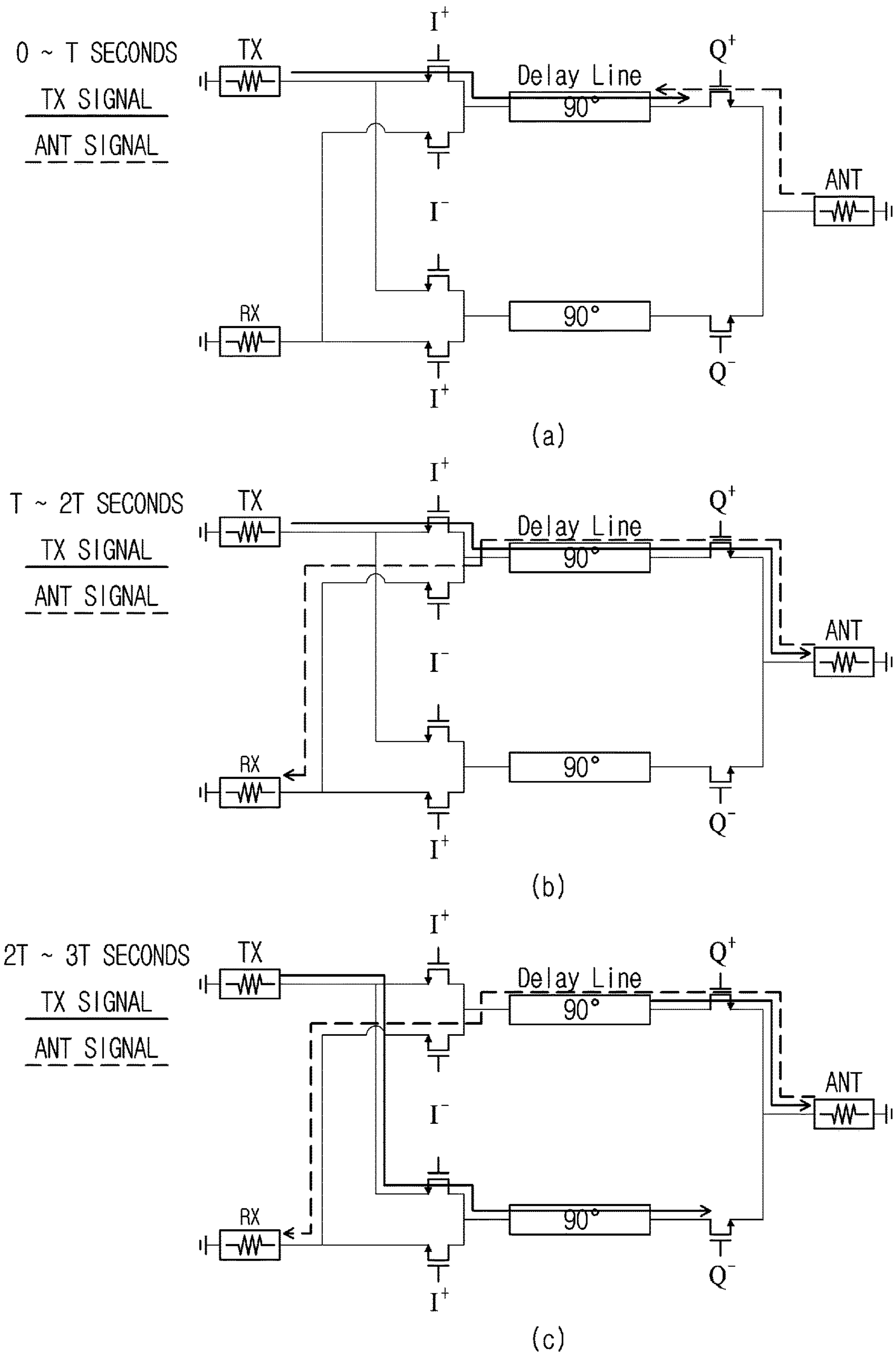
FIG. 11 is a diagram showing a method of transmitting and receiving a signal at a circulator according to an embodiment of the present disclosure.

As a more specific example, referring to FIG. 10, an antenna, a transmitting end (Tx), and a receiving end (Rx) in a terminal may be configured based on a communication circuit. Here, a DPDT (double pole double throw) switch 1010 is connected to the transmitting end and the receiving end, a delay line is configured between the DPDT switch and a SPDT (single pole double throw) switch 1020, and the antenna may be connected to the SPDT. At this time, as an example, the DPDT switch 1010 may be a switch in which two switches based on two poles are connected to the transmitting end and the receiving end, respectively. In addition, the SPDT 1020 may be a switch in which two switches based on one pole are connected to an antenna. At this time, as an example, the DPDT switch 1010 may operate by $I^+$ and $I^-$ (differential in-phase) clocks, and the SPDT switch 1020 may operate by $Q^+$ and $Q^-$ (differential quadrature) clocks. In addition, the delay line may have an electrical length of 90° at a switching frequency. As an example, FIG. 11 is a diagram showing movement of a transmission signal (Tx signal) and a reception signal (Rx signal) over time based on the circulator of FIG. 10. Referring to FIG. 11(*a*), the terminal may receive an Rx signal through an antenna at 0 to T seconds, and the received Rx signal may reach the SPDT switch 1020. In addition, the terminal may generate a Tx signal through the transmitting end at 0 to T seconds. At this time, the Tx signal may pass through the delay line through the switch turned on by the $I^+$ clock among the DPDT switches 1010 and reach the SPDT switch 1020. Here, the delay line may have delay of T seconds. That is, the Tx signal generated at the transmitting end may be transmitted to the SPDT switch 1020 through the delay line with delay of T seconds by $I^+$ of the DPDT switch 1010.

Figure 12:
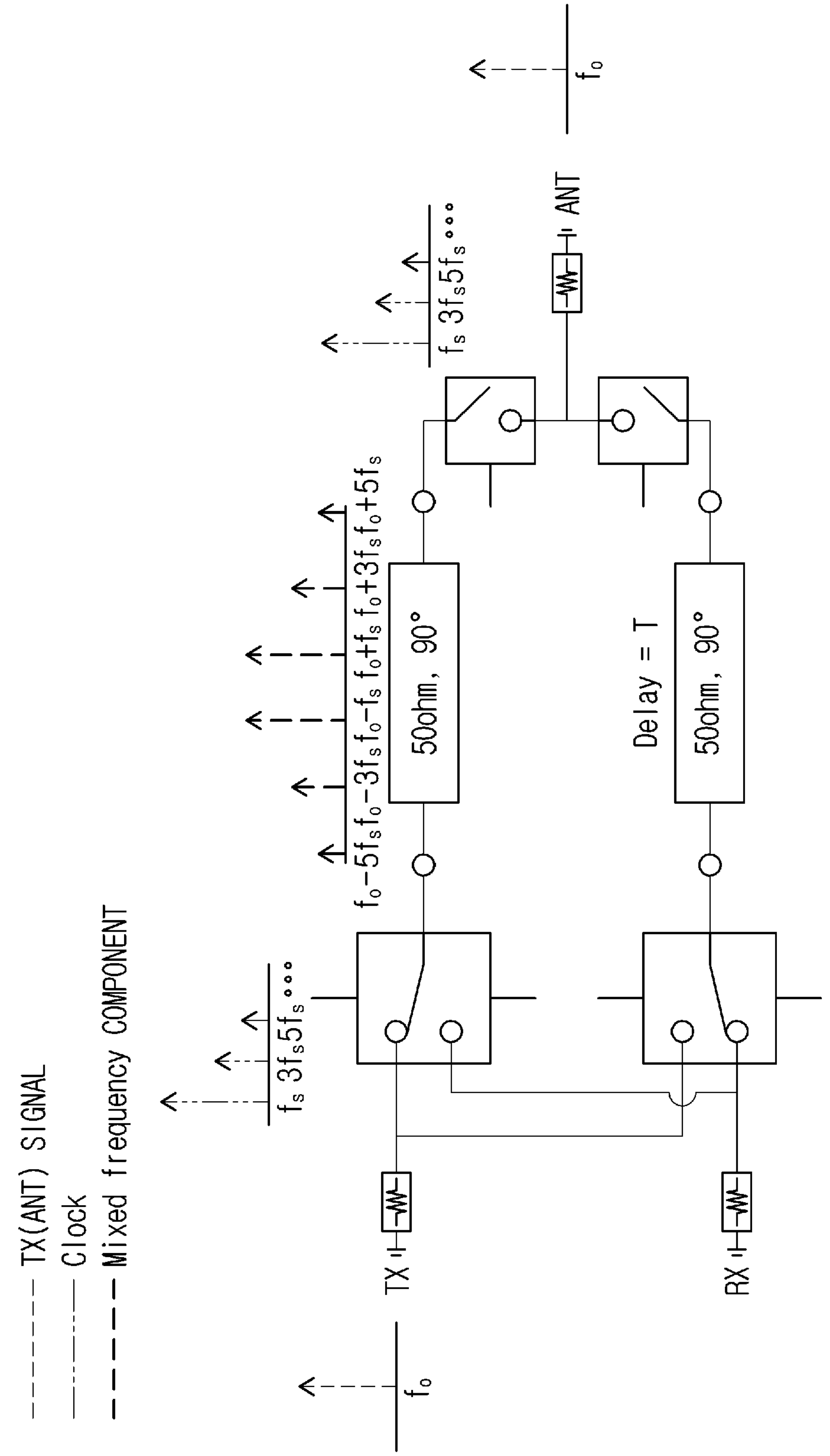
FIG. 12 is a diagram showing a frequency component at a circulator according to an embodiment of the present disclosure.

Then, referring to FIG. 11(*b*), at T seconds to 2T seconds, the Tx signal that has passed through the delay line may reach the antenna through the switch turned on through the $Q^+$ clock of the SPDT switch 1020. In addition, at T seconds to 2T seconds, the Rx signal may also pass through the delay line and reach the DPDT switch 1010 through the switch turned on through the $Q^+$ clock of the SPDT switch 1020. Then, referring to FIG. 11(*c*), at 2T seconds to 3T seconds, the Rx signal that has passed through the delay line may be transferred to the receiving end through the switch turned on through the $I^-$ clock of the DPDT switch 1010. In addition, a new Tx signal generated at the transmitting end may pass through the delay line through the $I^-$ clock of the DPDT switch 1010 and reach the $Q^-$ clock of the SPDT switch 1020. In other words, the transmission signal may move from the transmitting end to the antenna through the switch in the circulator, and the reception signal may move from the antenna to the receiving end at the same time. At this time, as an example, FIG. 12 may show a frequency domain operation of a circulator. For example, a transmission signal (Tx (ANT) signal) may be moved to the antenna by the DPDT switch 1010 and the SPDT switch 1020, as described above. At this time, the Tx (ANT) signal may be mixed into first, second, third, . . . , n-th mixed frequency components by the DPDT switch 1010. At this time, each mixed frequency component may be unmixed again in the SPDT switch 1020 after passing through the delay line, converted into the original frequency, and transferred to the antenna. On the other hand, the reception signal may be mixed into first, second, third, . . . , n-th mixed frequency components by the SPDT switch 1020. At this time, each mixed frequency component may be unmixed again in the DPDT switch 1010 after passing through the delay line, converted into the original frequency, and transferred to the receiving end.

At this time, as an example, since the Tx (ANT) signal is converted into a mixed frequency by the DPDT switch 1010 and transferred to the SPDT switch 1020, matching and delay of the delay line must be satisfied in an infinite frequency band to operate as a loss-free circulator. However, in order to satisfy matching and delay of the delay line in the infinite frequency band, the size of the delay line (or transmission line) may become very large and may not be suitable for implementing an integrated circuit. In addition, as an example, an artificial line using a capacitor and an inductor may be small in size, but a frequency band that satisfies matching and delay may be narrow. In other words, additional losses may be caused in the circulator. At this time, the circulator used in full duplex radio needs to transmit a Tx signal with high transmission power to the antenna, and accordingly, high power handling may be required. However, due to the inherently low power handling characteristics of the switch, the power handling of the circulator may also be low. Therefore, a terminal for full duplex radio may require a circulator with low loss.

Figure 13:
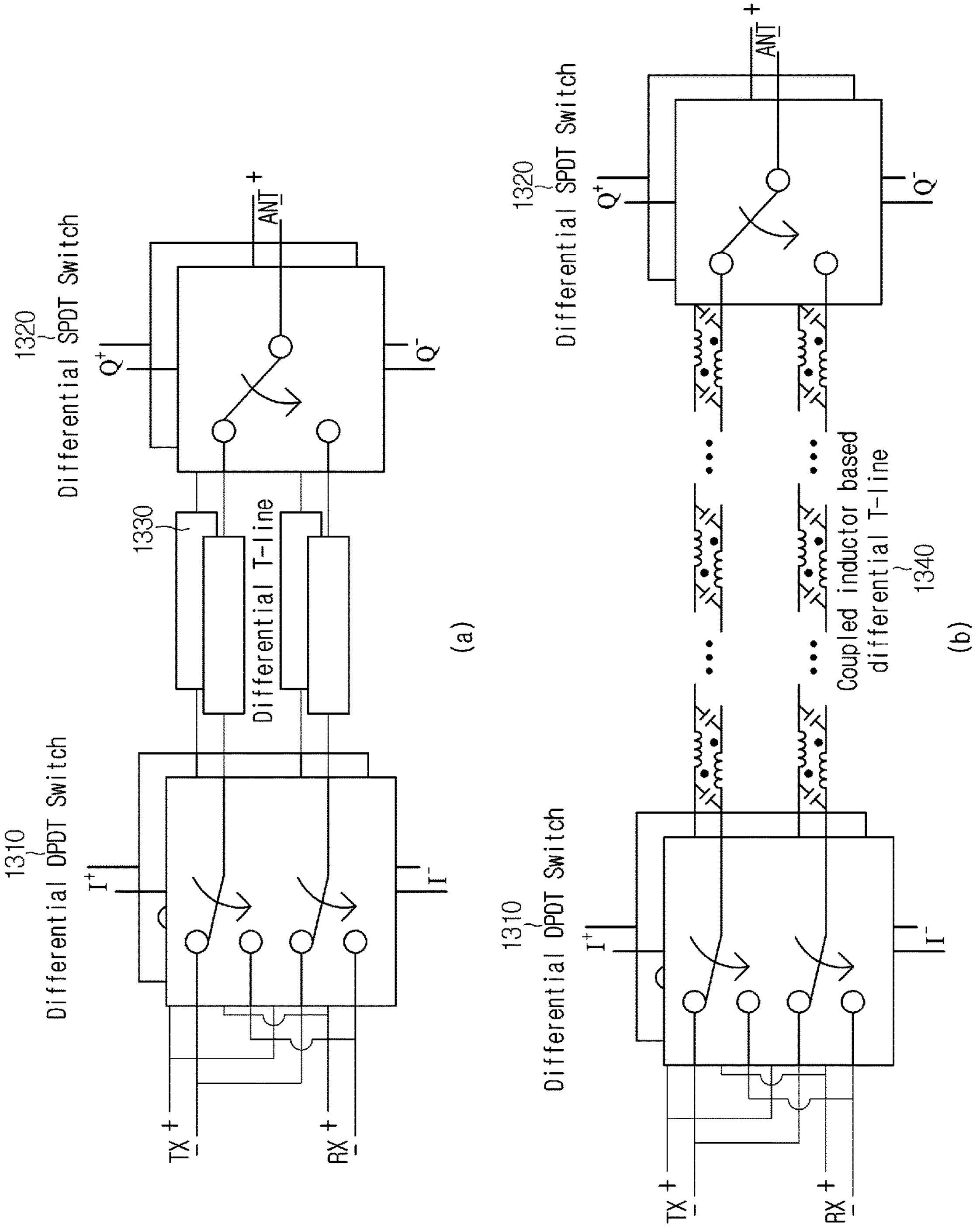
FIG. 13 is a diagram showing a differential circulator according to an embodiment of the present disclosure.

In consideration of the above-mentioned points, the circulator may be composed of a differential circulator as shown in FIG. 13(*a*). At this time, each of the transmitting end and the receiving end may be connected to two differential DPDT switches 1310. In addition, the antenna may also be connected to two differential SPDT switches 1320, and a delay line 1330 may also be implemented based on a differential circuit. This allows the circulator to have twice the power handling capability without additional switching clocks. In addition, as an example, referring to FIG. 13(*b*), a delay line between two DPDT switches 1310 and two SPDTs 1320 may be composed of a magnetically coupled inductor-based delay line 1340. At this time, the magnetically coupled inductor-based delay line 1340 has a wide frequency band that satisfies matching and delay, so loss may be low.

Figure 14:
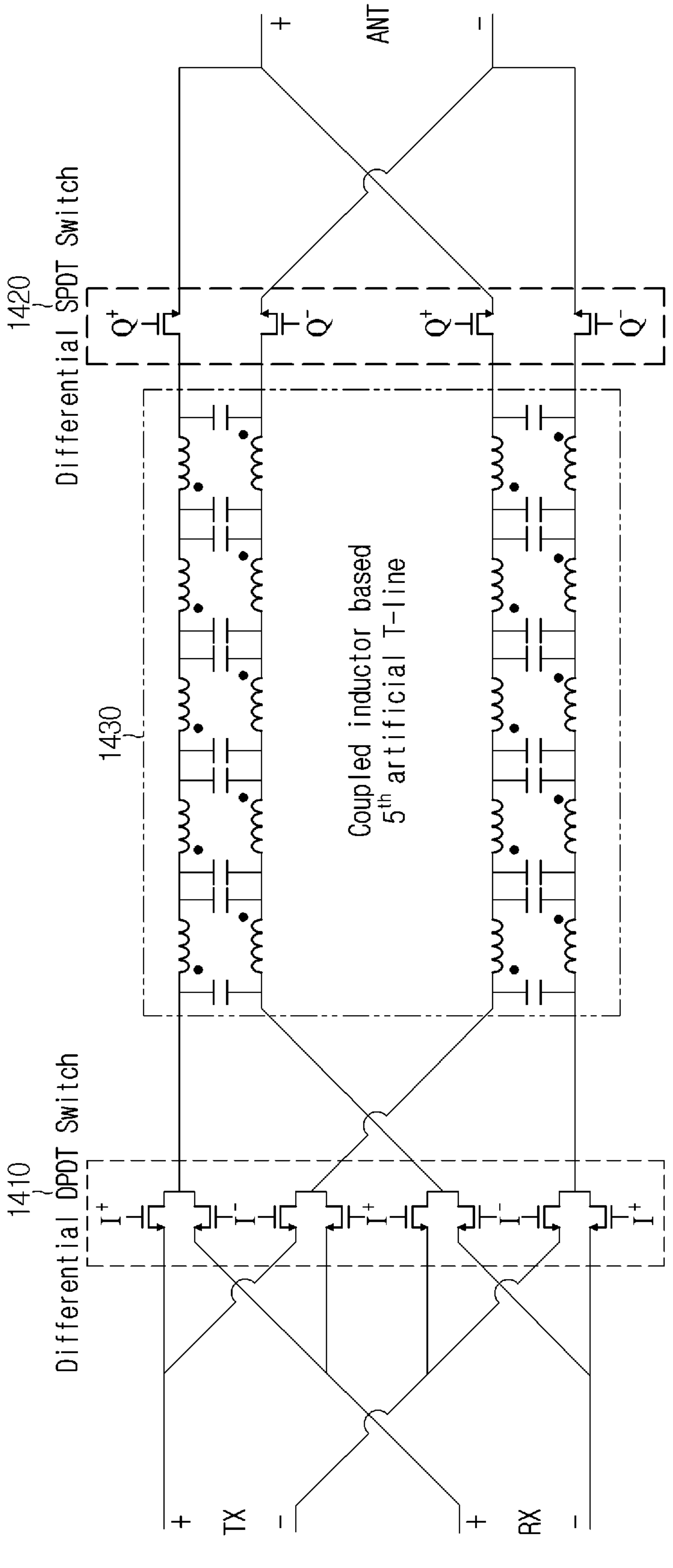
FIG. 14 is a diagram showing a differential circulator according to an embodiment of the present disclosure.

As an example, FIG. 14 is a diagram showing a differential circulator integrated with low loss using a magnetically coupled inductor-based delay line based on FIG. 13(*b*). As described above, the circulator may be configured without using a magnetic material so that it may be integrated. In addition, the circulator may require a method of reducing loss because a signal is converted into a mixed frequency component based on a switch and passes through a delay line. Considering the above, the circulator may use a magnetically coupled inductor-based delay line. In addition, the circulator is a differential circulator and may use a differential switch.

As an example, referring to FIG. 14, each of the transmitting end and the receiving end may be connected to two DPDT switches 1410, and an antenna ANT may be connected to two SPDT switches. At this time, a magnetically coupled inductor-based delay line 1430 may be located between the DPDT switch 1410 and the SPDT switch 1420. That is, the circulator is a differential circulator, and all the transmitting end, the receiving end, and the antenna may be connected to two switches based on a differential circuit. At this time, the differential circulator with a magnetically coupled inductor-based delay line may have twice the power handling capability compared to the circulator of FIG. 10. Here, the magnetically coupled inductor-based delay line 1410 has a wide frequency band that satisfies matching and delay, so loss may be low. At this time, since the magnetically coupled inductor-based delay line 1410 may be integrated, integration may be possible while reducing power loss. In addition, maximum power handling may be performed while satisfying reliability by adjusting the optimal clock switching of the differential circulator.

At this time, in the differential circuit-based circulator, since half of the Tx signal is transferred to each DPDT switch 1410, when the same switch is used, a Tx signal twice as large may be transferred to the ANT.

Figure 15A:
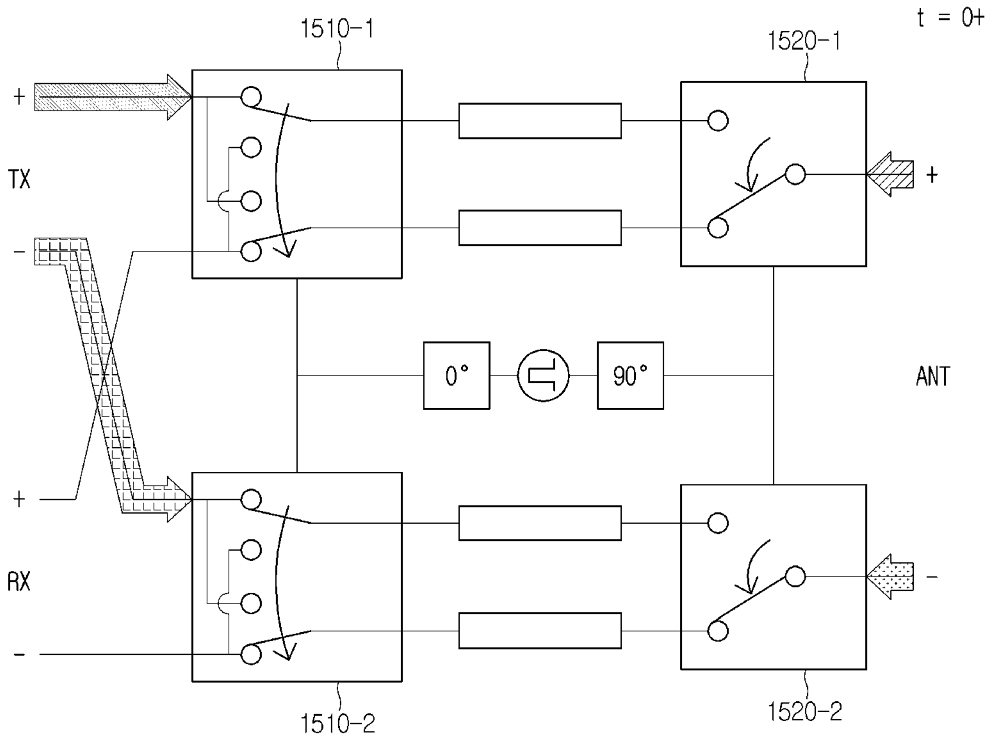
FIGS. 15A to 15I are diagrams showing a method of operating a differential circulator according to an embodiment of the present disclosure.
Figure 15B:
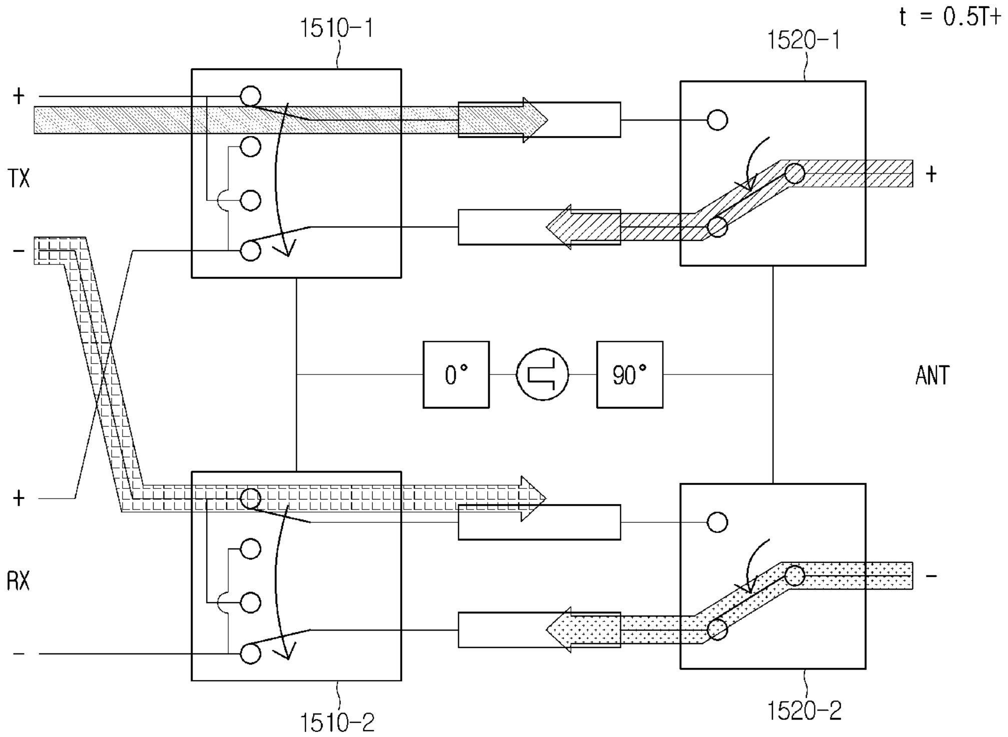

More specifically, referring to FIG. 15A, when t=0, a Tx signal may be generated and an Rx signal may be received through an antenna. At this time, since it is a differential circulator, the generated Tx signal may be transferred to each DPDT switch 1510-1, 1510-2, and the received Rx signal may also be transferred to each SPDT switch 1520-1, 1520-2. Here, each DPDT switch 1510-1, 1510-2 may have four switches having two input terminals and two output terminals. Additionally, each SPDT switch 1520-1, 1520-2 may have two switches having one input terminal and two output terminals. As an example, the Tx signal may pass through an activated upper path based on the four switches of each DPDT switch 1510-1, 1510-2. Additionally, the Rx signal may pass through a lower path based on the two switches of each SPDT switch 1520-1, 1520-2. Then, referring to FIG. 15B, when t=0.5t, the Tx signal, which has passed through each DPDT switch 1510-1, 1510-2, is located in the middle of the delay line, and the Rx signal, which has passed through each SPDT switch 1520-1, 1520-2 may also be located in the middle of the delay line. As an example, the delay line may have an electrical length of T seconds, as described above.

Figure 15C:
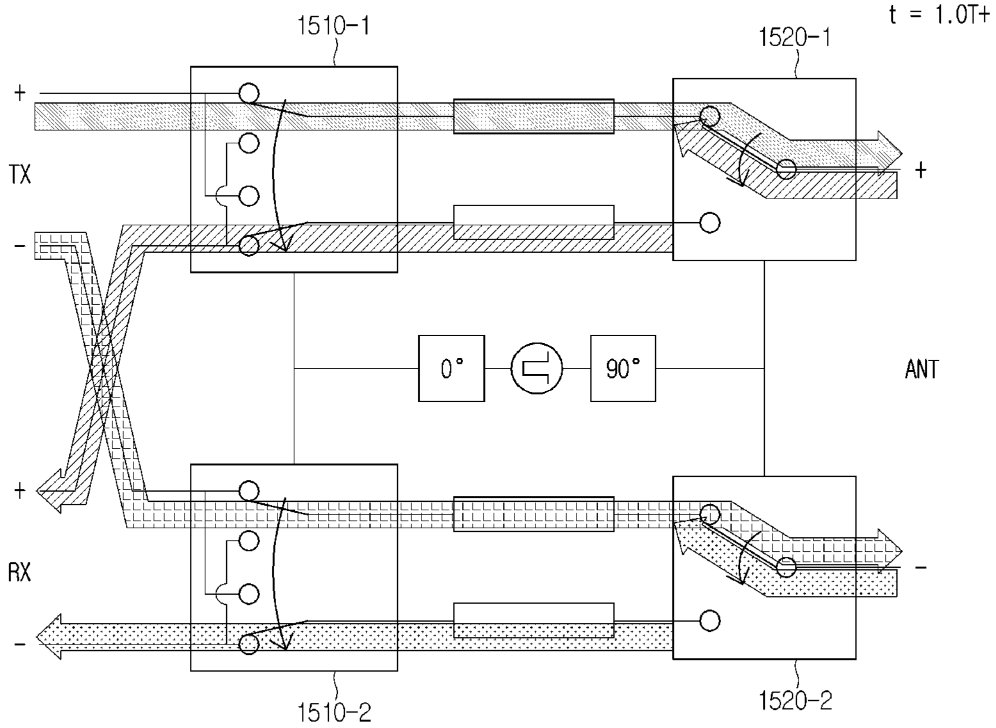

Then, referring to FIG. 15C, at t=1T, each SPDT switch 1520-1, 1520-2 is switched to activate the upper path and deactivate the lower path. Accordingly, the Tx signal may be transferred to the antenna port without loss through the upper path of each SPDT switch 1520-1, 1520-2. Additionally, the Rx signal may be transferred to the receiving end (Rx port) through the activated lower path of each DPDT switch 1510-1, 1510-2. Additionally, the Rx signal may be transferred from the antenna to each SPDT switch 1520-1, 1520-2 through the upper path of each activated SPDT switch 1520-1, 1520-2.

Figure 15D:
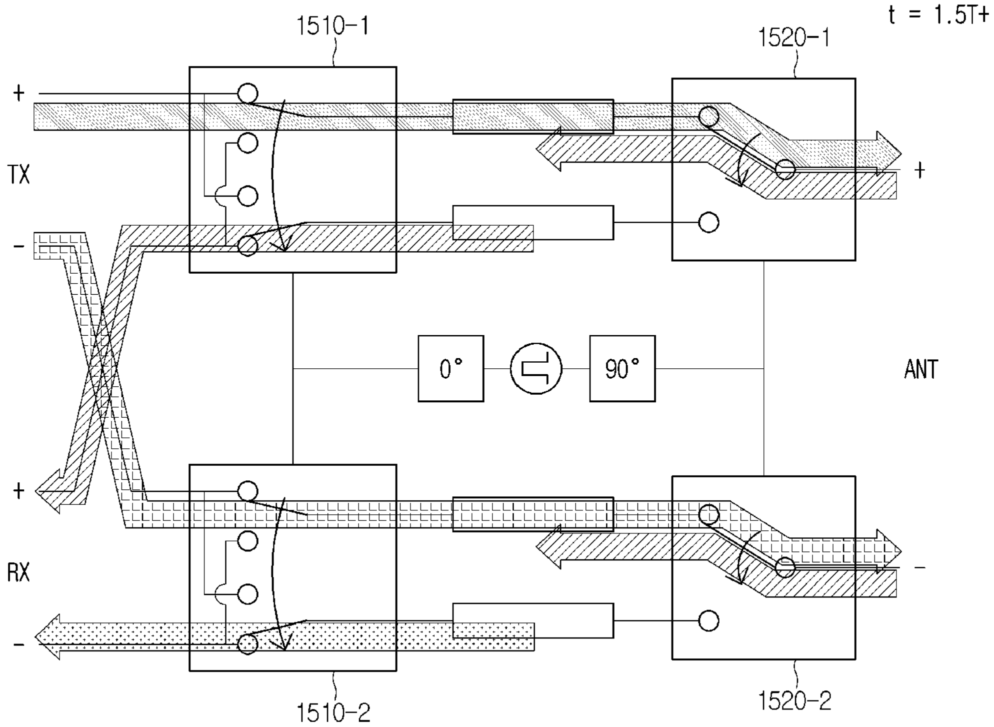

Then, referring to FIG. 15D, at t=1.5T, the Rx signal transferred from the antenna to each SPDT switch 1520-1, 1520-2 through the upper path of each activated SPDT switch 1520-1, 1520-2 may reach the middle of the delay line. At the same time, the Rx signal may be transferred to the receiving end (Rx port) through the lower path of each activated DPDT switch 1510-1, 1510-2.

Figure 15E:
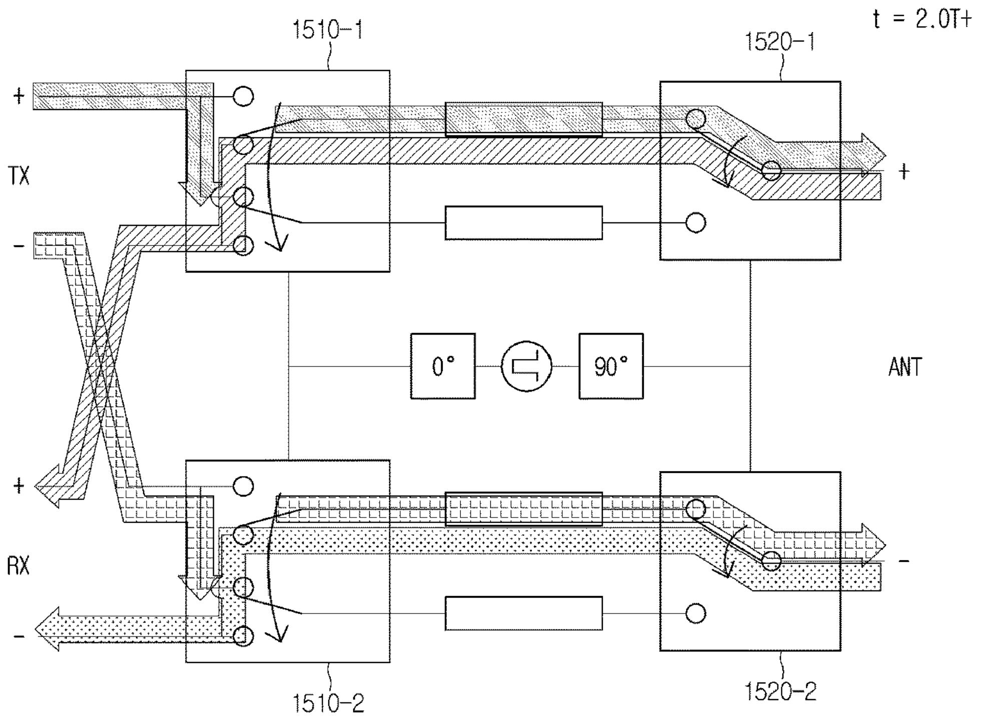

Then, referring to FIG. 15E, at t=2.0T, the Rx signal that has reached the middle of the delay line may reach each DPDT switch 1510-1, 1510-2. At this time, the upper path of each DPDT switch 1510-1, 1510-2 is deactivated and a second path is activated, so that each Rx signal may be transferred to the receiving end without loss. Here, a new Tx signal may be transferred to each DPDT switch 1510-1, 1510-2. For example, the lower path of each DPDT switch 1510-1, 1510-2 is deactivated and a third path is activated, so that the Tx signal may pass through the third path.

Figure 15F:
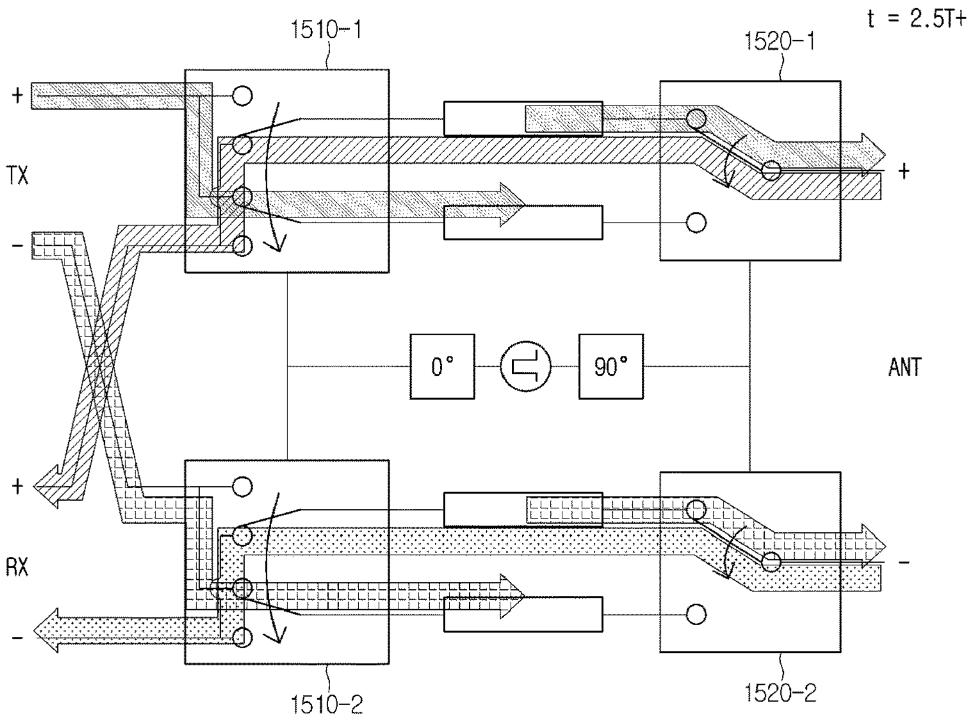

Then, referring to FIG. 15F, at t=2.5T, the new Tx signal may reach the middle of the delay line through the activated third path of each DPDT switch 1510-1, 1510-2. At the same time, the existing Tx signal may be transferred to the antenna along the activated upper path of each SPDT switch 1510-1, 1510-2. Additionally, at the same time, the Rx signal may be transferred to the receiving end along the activated second path of each DPDT switch 1510-1, 1510-2.

Figure 15G:
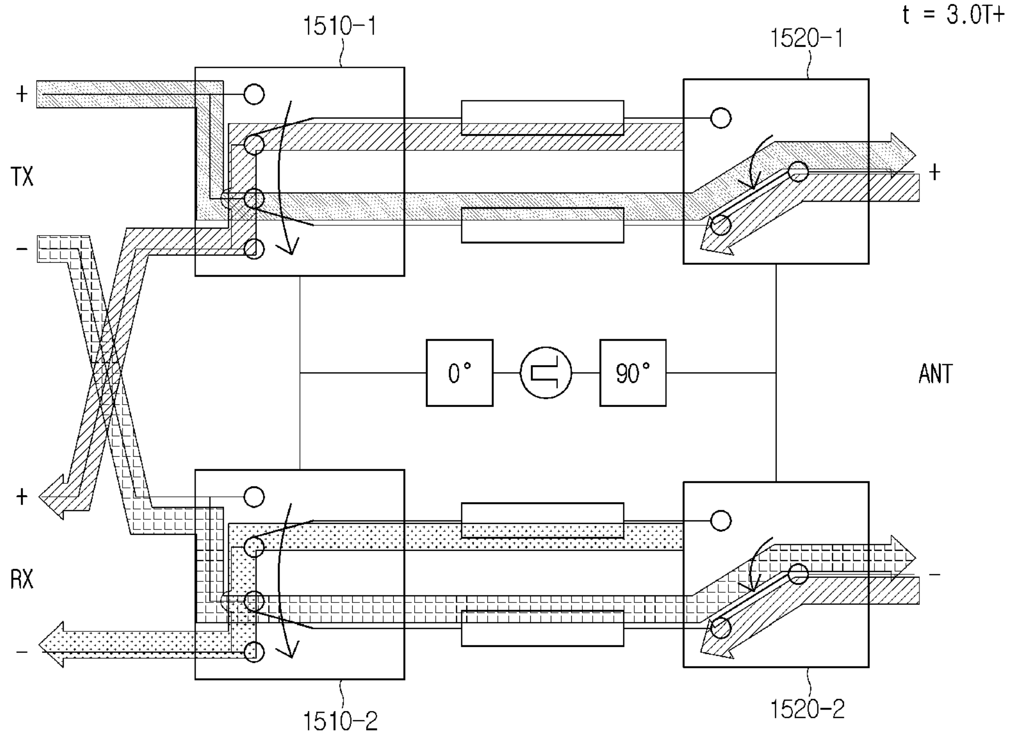

Then, referring to FIG. 15G, at t=3.0T, each SPDT switch 1520-1, 1520-2 is switched to deactivate the upper path and activate the lower path. Accordingly, the new Tx signal that has reached the middle of the delay line may be transferred to the antenna along the activated lower path of each SPDT switch 1520-1, 1520-2. Additionally, at the same time, the Rx signal may be transferred to the receiving end along the activated second path of each DPDT switch 1510-1, 1510-2. At this time, the new Rx signal may be transferred to each SPDT switch 1520-1, 1520-2.

Figure 15H:
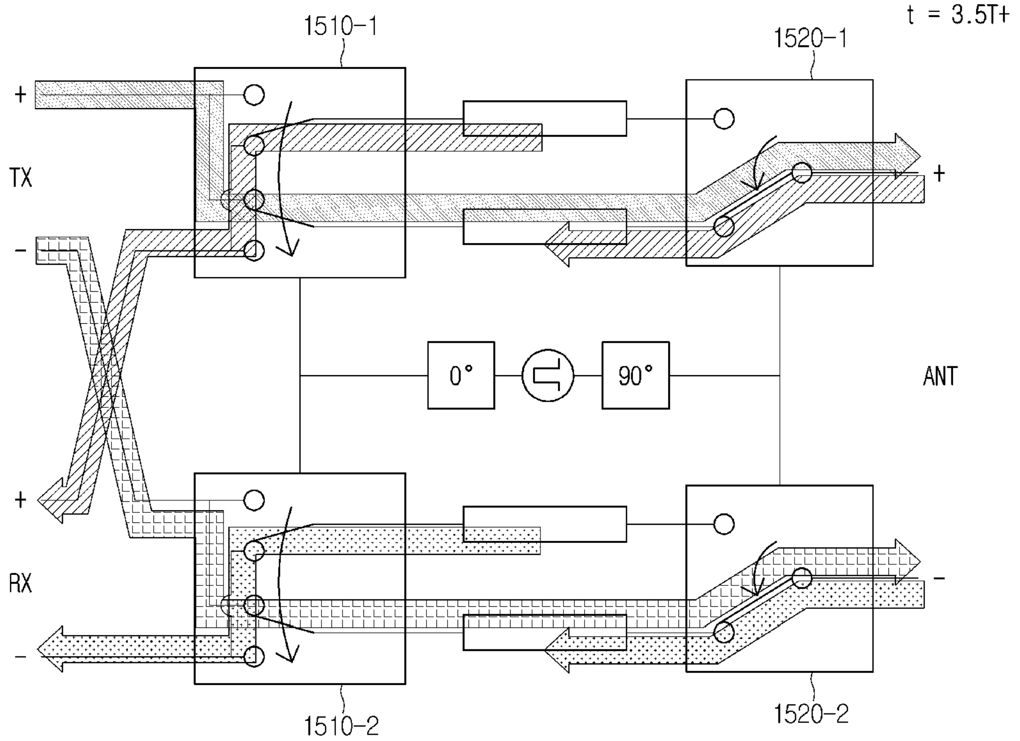

Then, referring to FIG. 15H, at t=3.5T, the new Rx signal may reach the middle of the delay line along the lower path of each activated SPDT switch 1520-1, 1520-2. At the same time, the Tx signal may be transferred to the antenna along the lower path of each activated SPDT switch 1520-1, 1520-2.

Figure 15I:
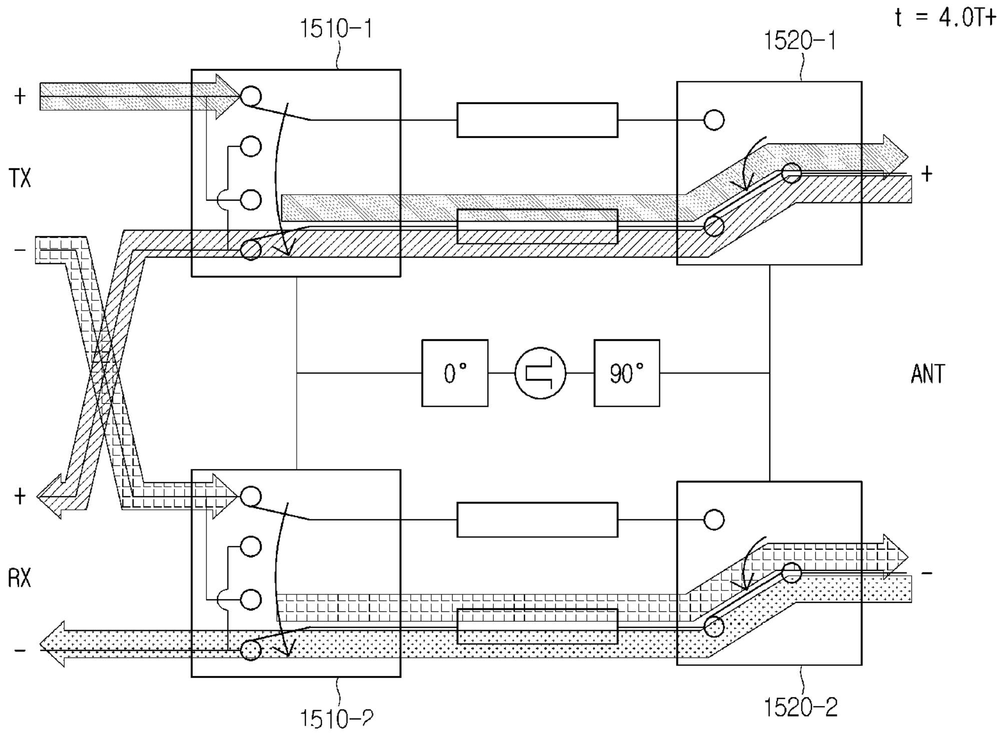

Then, referring to FIG. 15I, at t=4T, each DPDT switch 1510-1, 1510-2 is switched to activate the upper path and deactivate the second path. Additionally, each DPDT switch 1510-1, 1510-2 may be switched to deactivate the third path and activate the lower path. At this time, the existing Tx signal may be transferred to the antenna along the lower path of each activated SPDT switch 1520-1, 1520-2. At the same time, the new Tx signal may reach the upper path of the activated DPDT switch 1510-1, 1510-2. That is, based on the above-described FIGS. 15A to 15I, the Tx signal may be transferred from the transmitting end to the antenna, and the Rx signal may be transferred from the antenna to the receiving end, through which full duplex radio may be performed.

Figure 16A:
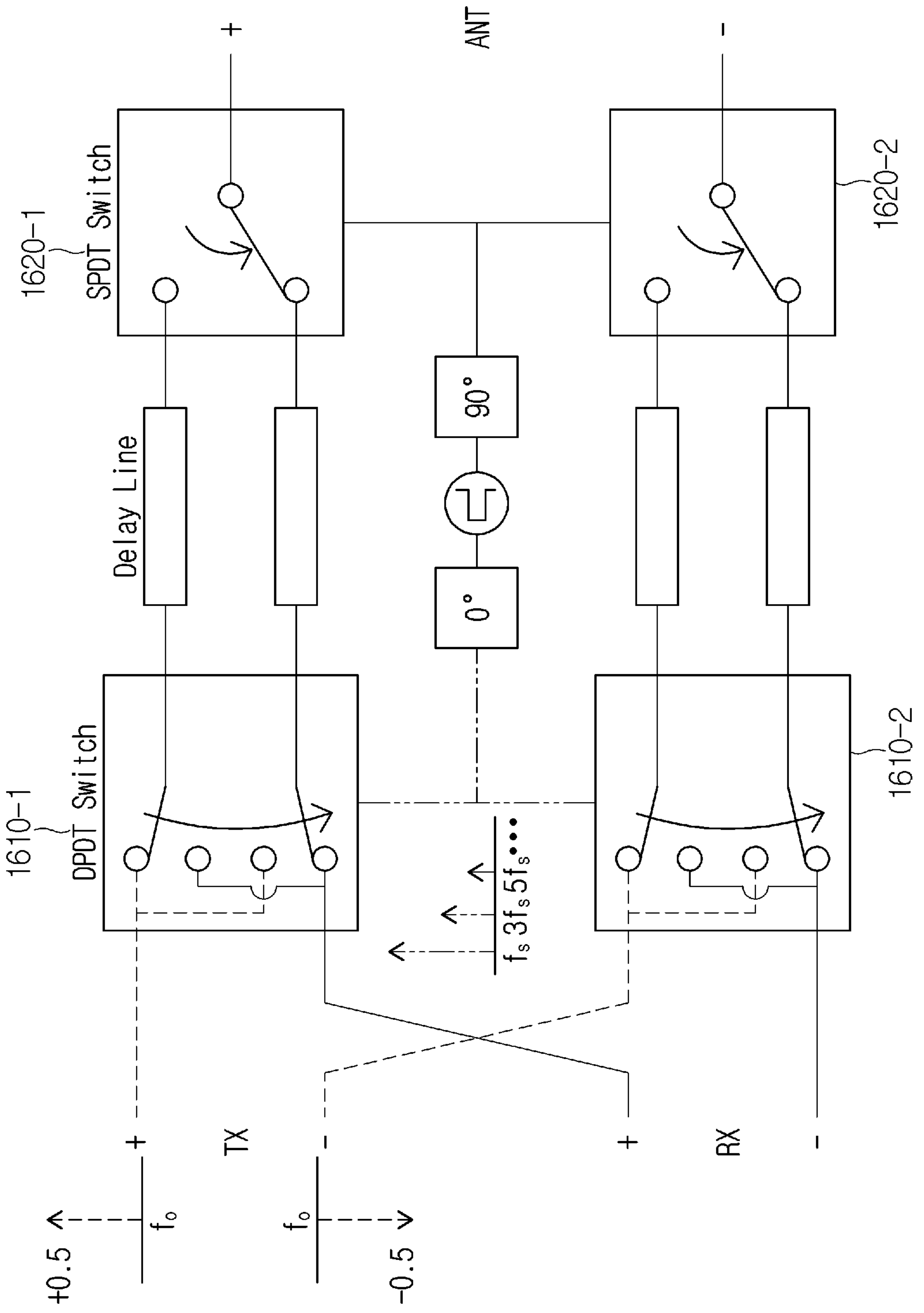
FIGS. 16A to 16C are diagrams showing a frequency component at a different circulator according to an embodiment of the present disclosure.
Figure 16B:
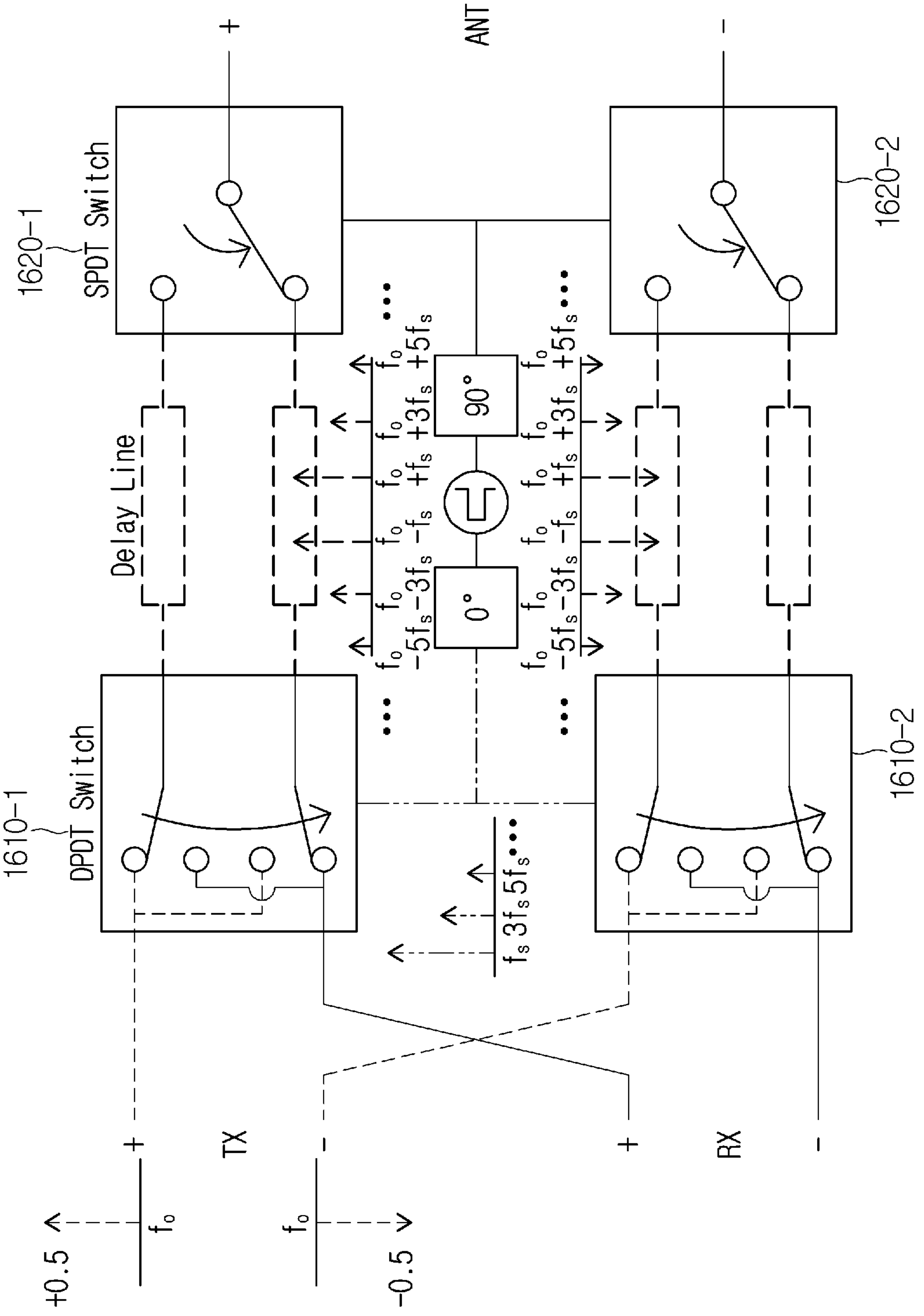
Figure 16C:
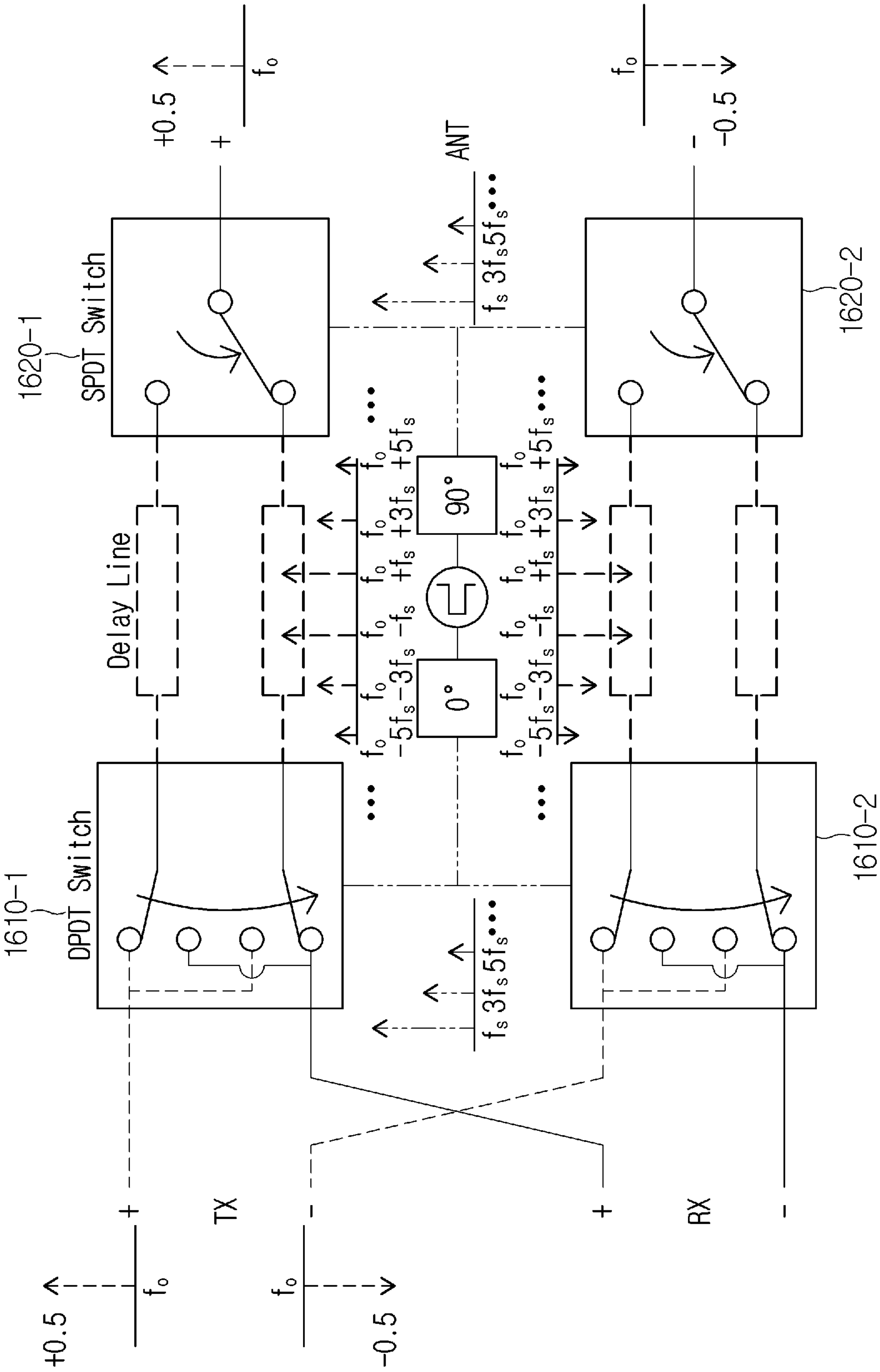

Additionally, as an example, FIGS. 16A to 16C are diagrams showing operation of a transmission signal in the frequency domain. Referring to FIG. 16A, different input signals may reach each DPDT switch 1610-1, 1610-2 based on $f_o$. At this time, the pulse of the clock may range from +1 to −1 based on $f_s$, and a frequency element may be composed of an odd multiple of $f_s$. Additionally, as an example, the delay line may have a phase difference of 90 degree with $. Afterwards, the input signal may be mixed with the clock at each DPDT switch 1610-1, 1610-2 and transferred to the delay line. Here, the mixed frequency may be configured based on odd multiples of $f_o$ and $f_s$, as shown in FIG. 16B. The mixed frequency may then reach each SPDT switch 1620-1, 1620-2. At this time, as an example, referring to FIG. 16C, each SPDT switch 1620-1, 1620-2 performs combination of frequency elements, and through this, different input signals based on $f_o$ may be restored. Based on the above, the terminal performing full duplex radio may perform transmission and reception simultaneously.

Figure 17:
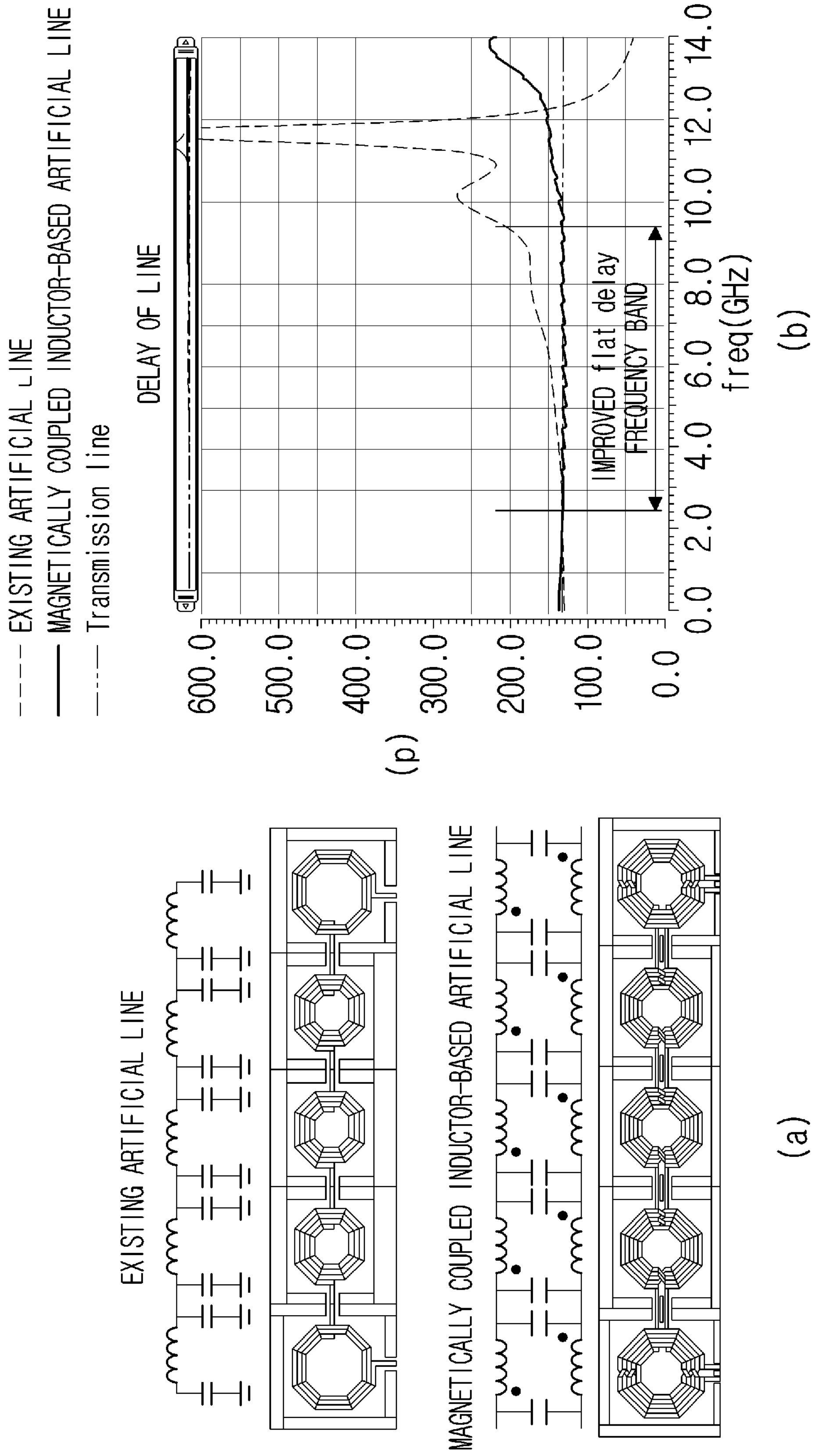
FIG. 17 is a diagram showing a magnetically coupled inductor-based delay line according to an embodiment of the present disclosure.

Also, as an example, FIG. 17(*a*) may be a delay result between an existing delay line and a magnetically coupled inductor-based delay line. For example, a magnetically coupled inductor may generate two types of parasitic capacitors as a direct capacitor and a cross capacitor. At this time, the direct capacitor may have a frequency at which line delay increases, and the cross capacitor may have a frequency at which line delay may decrease. At this time, the magnetically coupled inductor may create desired delay in a wider frequency band based on the characteristics of the two capacitor components, and results shown in FIG. 17(*b*) may be derived.

Figure 18:
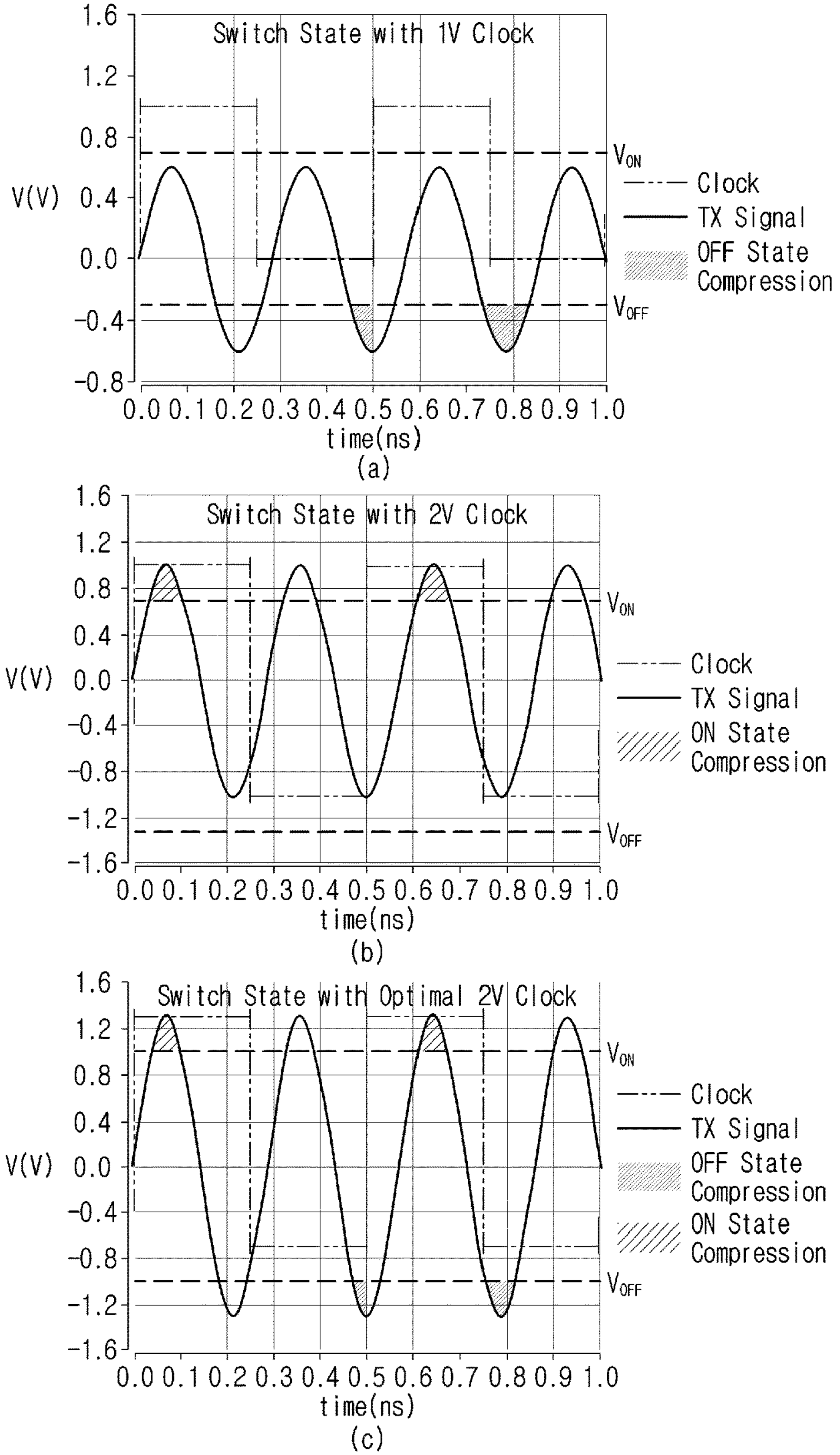
FIG. 18 is a diagram showing an on/off state of a switch based on a clock according to an embodiment of the present disclosure.

Also, as an example, FIG. 18 is a diagram showing a method of handling a clock for a switch. FIG. 18(*a*) may show a case of using a 1V clock, and FIG. 18(*b*) may show a case of using a 2V clock. Additionally, FIG. 18(*c*) shows a case where a 2V clock is used, and shows a switch on/off state over time when an optimal bias is applied. For example, when a 1V clock is used and when a 2V clock is used, one of ON state compression and OFF state compression may occur first, limiting the power handling of the switch. As an example, ON state compression may mean a phenomenon in which a switch that is supposed to be in the on state is changed to the off state by an input signal with a large amplitude, thereby limiting power handling of the switch. On the other hand, OFF state compression may mean a phenomenon in which a switch that is supposed to be in the on state is changed to the off state by an input signal with a large amplitude, thereby limiting power handling of the switch. Here, in a 2V clock to which an optimal bias is applied as shown in FIG. 18(*c*), both situations may occur simultaneously, and through this, maximum power handling may be obtained.

Figure 19:
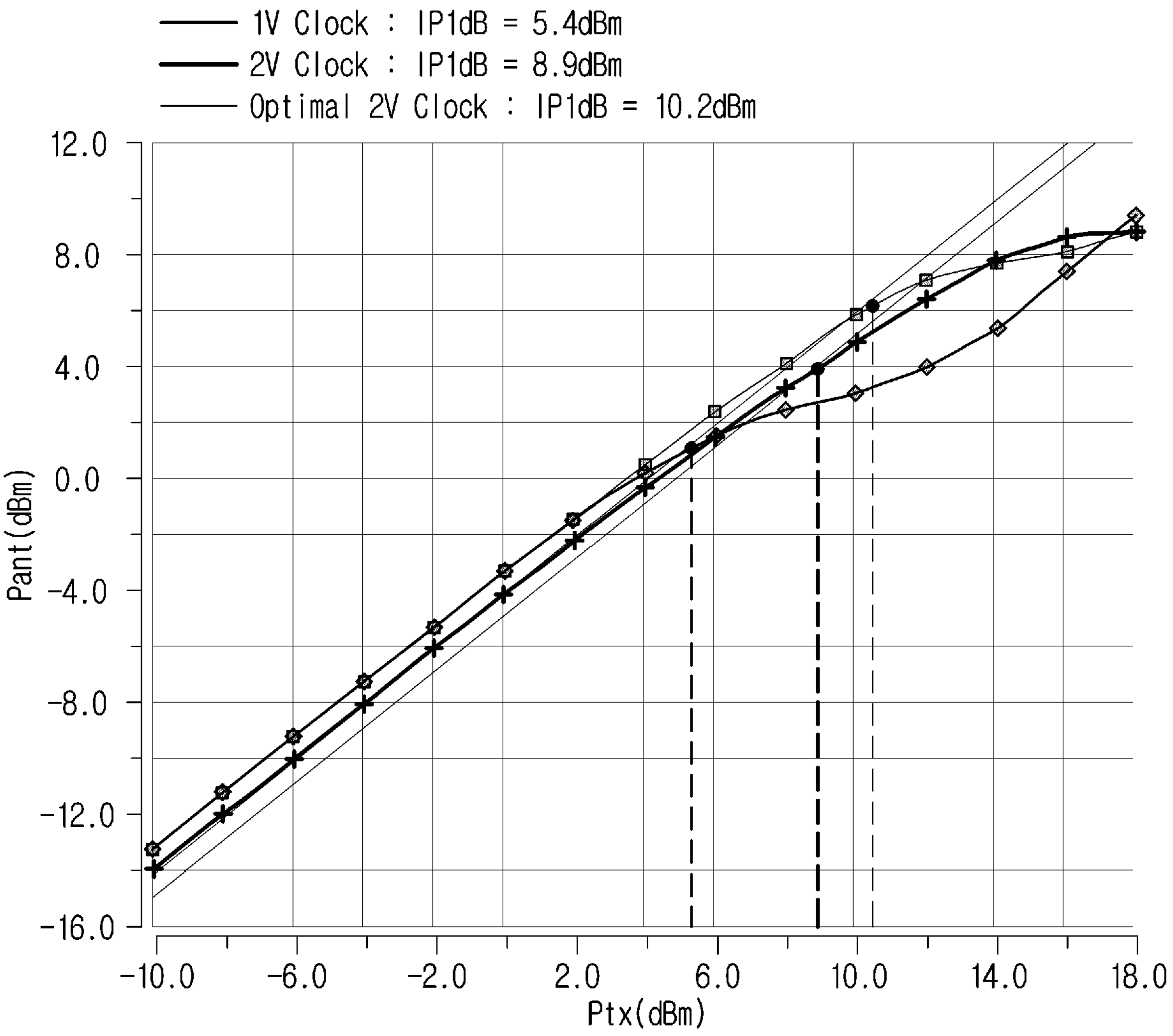
FIG. 19 is a diagram showing loss of a path transferring a Tx signal of a circulator to an antenna based on a clock according to an embodiment of the present disclosure.

As an example, power handling of the path transferred from the transmitting end of the circulator to the antenna according to the clock may be as shown in FIG. 19. In other words, as described above, when a 1V clock is used, the IP1dB of the circulator is limited by OFF state compression to 5.4 dBm, whereas when a 2V clock to which an optimal bias is applied is used, the IP1dB of 10.2 dBm may be shown by an increase of 4.8 dBm and is not limited thereto.

Figure 20:
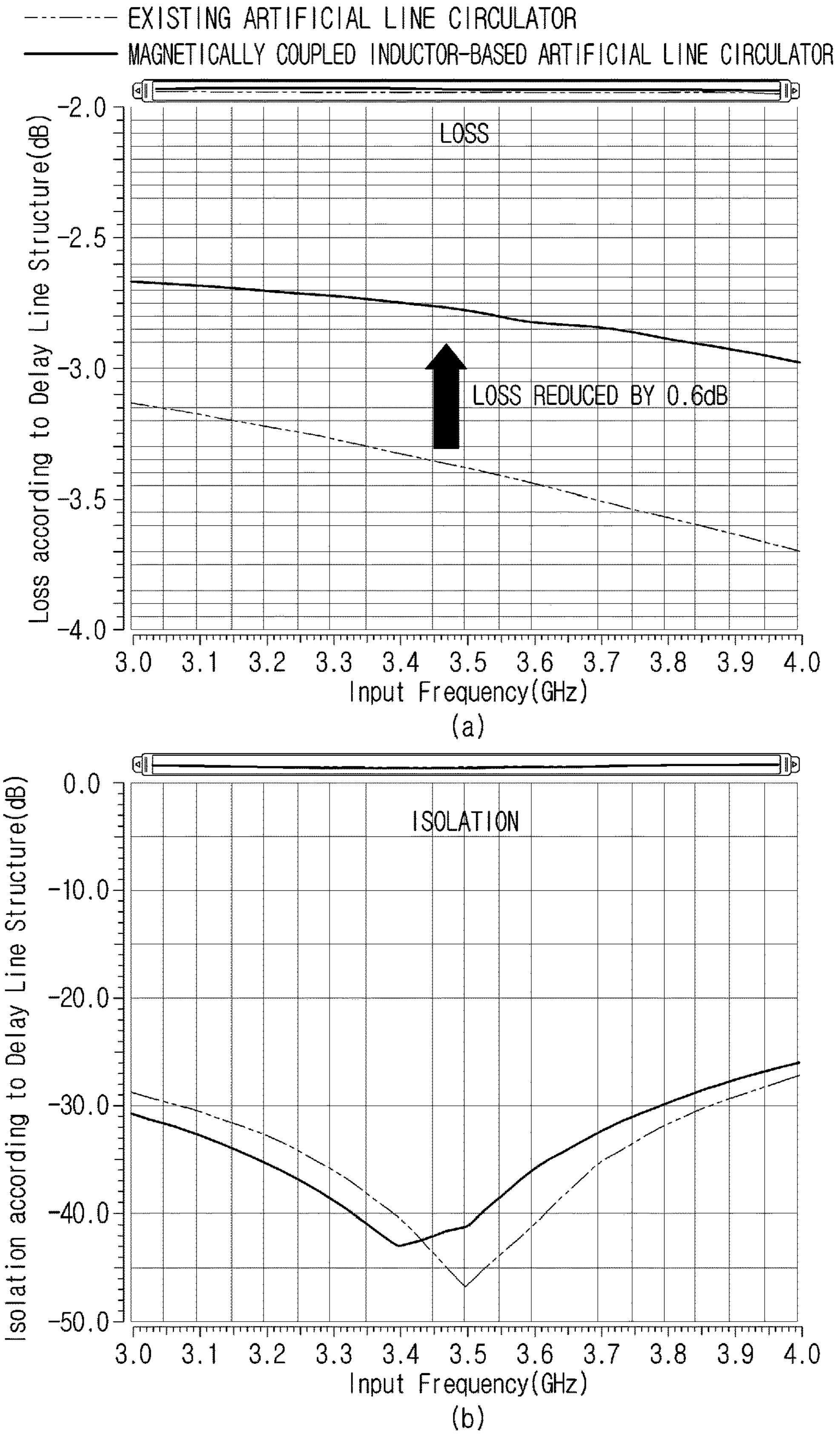
FIG. 20 is a diagram showing loss of a circulator of a magnetically coupled inductor-based delay line according to an embodiment of the present disclosure.

Additionally, as an example, in a differential circuit-based circulator, a 1 dB compression point of a signal transferred from the transmitting end to the antenna may increase by 3 dBm. As an example, the loss and isolation results of a circulator that operates based on an existing delay line as an existing single-circuit circulator and a magnetically coupled inductor-based circulator as a differential circuit circulator are as shown in FIGS. 20(*a*) and 20(*b*). For example, due to a delay line having delay and matching of a wide frequency band, the loss of the differential circuit circulator is reduced compared to the existing single circuit circulator, but the isolation performance of the existing single circuit circulator may still be secured.

Figure 21:
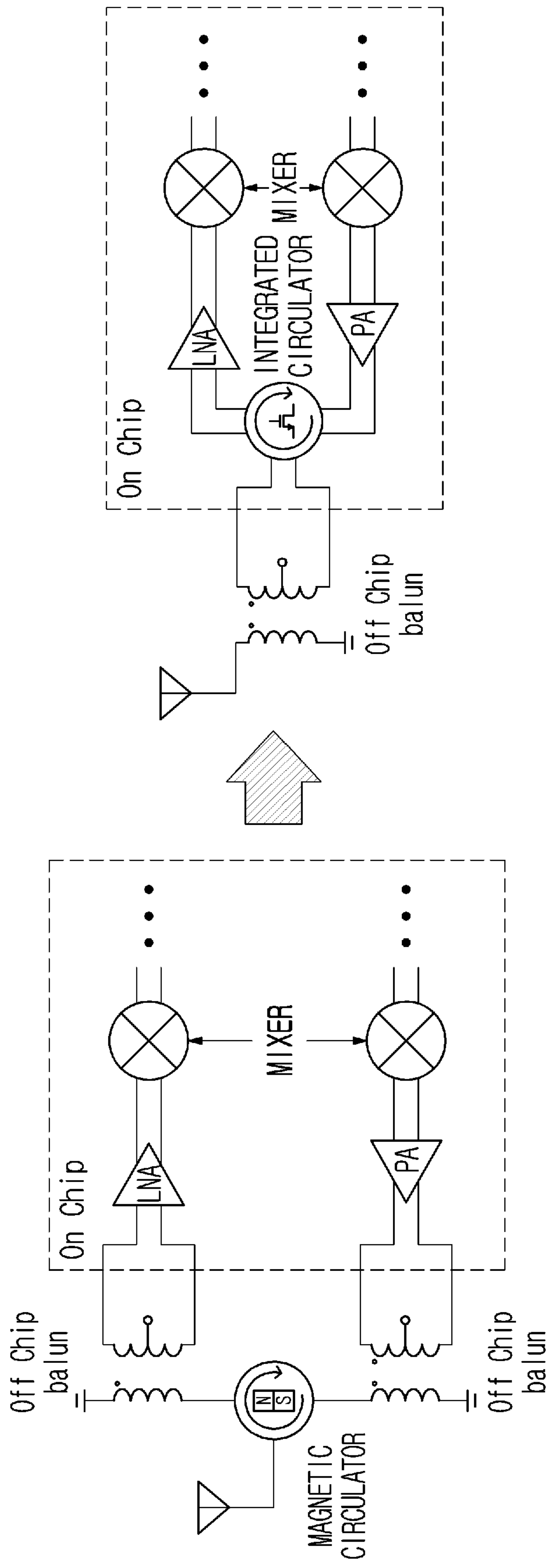
FIG. 21 is a diagram showing a non-magnetic material-based circuit according to an embodiment of the present disclosure.

Based on the above, in the differential circuit-based circulator, the number of all components may be doubled. However, the magnetically coupled inductor may implement two delay lines in one space, and the size of the inductor is also small, so circulator integration may be performed. Additionally, as an example, referring to FIG. 21, a circulator using a magnetic material may require two off-chip baluns for connection to the differential LNA and PA, but based on the above, in the magnetically coupled inductor-based differential circulator, the number of off-chip baluns necessary for connection to the differential LNA and PA may be reduced.

Figure 22:
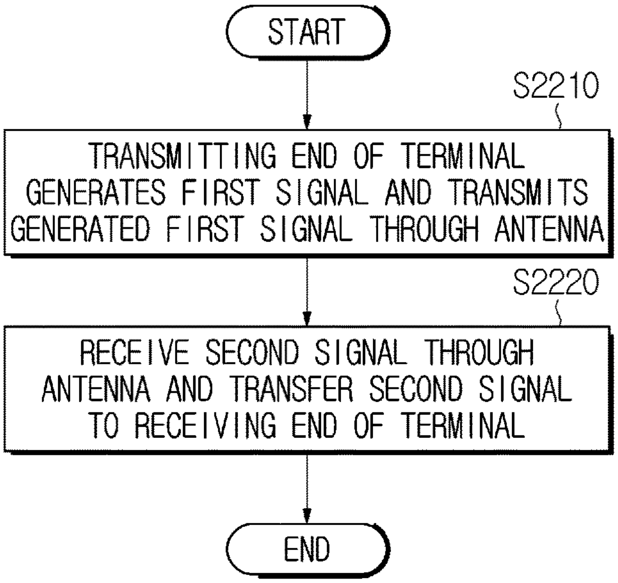
FIG. 22 is a flowchart illustrating a method of transmitting and receiving a signal at a terminal according to an embodiment of the present disclosure.

FIG. 22 is a flowchart showing a method of, at a terminal, transmitting and receiving a signal according to an embodiment of the present disclosure. Referring to FIG. 22, a transmitting end of the terminal may generate a first signal and transmit the generated first signal through an antenna (S2210). Additionally, the terminal may receive a second signal through an antenna and transfer the second signal to a receiving end (S2220). At this time, as an example, the terminal may transmit the first signal and receive the second signal at the same time. That is, the terminal may perform full duplex radio described above. At this time, as an example, the terminal may be equipped with a differential circulator between the transmitting end and the receiving end and the antenna for full duplex radio. At this time, as an example, the differential circulator may be a circulator that does not use a magnetic material, as described above. Additionally, as an example, the differential circulator may be a differential SSDL circulator including contiguous switches and delay lines. At this time, the differential SSDL circulator may include two DPDT switches and two SPDT switches. Here, a delay line may be configured between the two DPDT switches and the two SPDT switches, and the delay line may be configured based on the magnetically coupled inductor described above. Additionally, as an example, each of the two DPDT switches may include two input terminals and two output terminals. At this time, one of the input terminals of the DPDT switch may be connected to the transmitting end and the other may be connected to the receiving end. Additionally, each of the two output terminals of the DPDT switch may be connected to a delay line. Here, each of the two output terminals of the SPDT switch may be connected to the above-described delay line, and one input terminal of the SPDT may be connected to an antenna. That is, a differential SSDL circulator may be configured based on the above, and full duplex radio may be performed through this. Here, as an example, each of the two SPDT switches of the differential SSDL circulator may be switched from the first output terminal to the second output terminal at a first timing. That is, as shown in FIG. 15C described above, switching is performed in each SPDT switch to switch from the lower path to the upper path, as described above. Thereafter, switching may be performed in the two input terminals of each DPDT switch at a second timing later than the first timing. As an example, each of the two input terminals may be switched from the first input terminal to the second input terminal. That is, as shown in FIG. 15E described above, switching is performed in each DPDT switch, so that the Rx signal is transferred to the receiving end through the second path, and the Tx signal may pass through the third path. Thereafter, each SPDT switch may be switched from the second output terminal to the first output terminal again at a third timing later than the second timing. That is, as shown in FIG. 15G described above, switching is performed in each SPDT switch to switch from the upper path back to the lower path, as described above. Thereafter, switching may be performed in the two input terminals of each DPDT switch at a fourth timing later than the third timing. As an example, each of the two input terminals may be switched back from the second input terminal to the first input terminal. That is, as shown in FIG. 15I described above, switching is performed in each DPDT switch, so that the Rx signal may be transferred to the receiving end through the lower path, and the Tx signal may pass through the upper path, as described above. Additionally, as an example, as shown in FIGS. 16A to 16C described above, the signal generated at the transmitting end may be a signal generated based on the first frequency. At this time, the signal based on the first frequency may pass through two DPDT switches and then pass through the delay line based on a signal with a mixed frequency component. Thereafter, when the signal with the mixed frequency component passes through the SPDP switch, the first signal based on the first frequency may be restored, as described above.

Additionally, as an example, the delay line may be configured based on a magnetically coupled inductor, as described above. At this time, the delay line configured based on the magnetically coupled inductor may include a direct capacitor and a cross capacitor. At this time, as an example, the direct capacitor may have a frequency at which the delay of the delay line increases, and the cross capacitor may have a frequency at which the delay of the delay line decreases, as described above.

In addition, as an example, the terminal has been focused upon in the above description for convenience of description, but the same may be applied to the base station and may not be limited to a specific form. Additionally, as an example, in a device including at least one memory and at least one processor functionally connected to the at least one memory, the at least one processor may cause the device to, at a transmitting end of the device, generate a first signal and transmit the generated first signal through an antenna and receive a second signal through the antenna and transfer the second signal to a receiving end of the device, a differential circulator may be provided between the transmitting end and receiving end and the antenna, and the first signal may be transmitted and the second signal may be received at the same time based on the differential circulator. In addition, as an example of the present disclosure, a non-transitory computer-readable medium storing at least one instruction comprises the at least one instruction executable by a processor. The at least one instruction causes a device to, at a transmitting end of the device, generate a first signal and transmit the generated first signal through an antenna and receive a second signal through the antenna and transfer the second signal to a receiving end of the device, A differential circulator may be provided between the transmitting end and receiving end and the antenna, and the first signal may be transmitted and the second signal may be received at the same time based on the differential circulator. Here, the device and the computer-readable medium are equally applicable to the following system and various devices, and is not limited to a specific form.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 23:
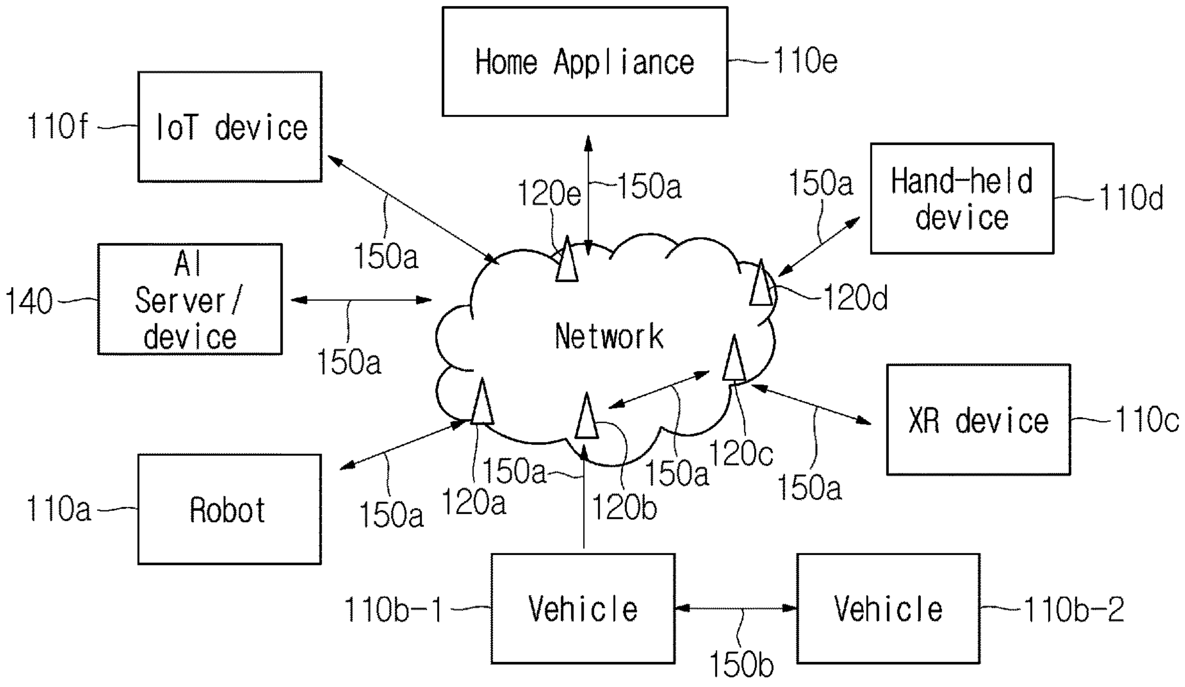
FIG. 23 illustrates an example of a communication system according to an embodiment of the present disclosure.

FIG. 23 illustrates an example of a communication system according to an embodiment of the present disclosure. The embodiment of FIG. 23 may be combined with various embodiments of the present disclosure.

Referring to FIG. 23, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110*a*, vehicles 110*b*-1 and 110*b*-2, an extended reality (XR) device 110*c*, a hand-held device 110*d*, a home appliance 110*e*, an Internet of Thing (IoT) device 110*f* or an artificial intelligence (AI) device/server 110*g*. For example, the vehicle may include a vehicle having a wireless communication function, an autonomous vehicle, a vehicle capable of performing vehicle-to-vehicle communication or the like. Here, the vehicles 110*b*-1 and 110*b*-2 may include an unmanned aerial vehicle (UAV) (e.g., drone). The XR device 110*c* may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110*d* may include a smartphone, a smart pad, a wearable device (e.g., a smartwatch or smart glasses), a computer (e.g., a laptop, etc.), etc. The home appliance 110*e* may include a TV, a refrigerator, a washing machine, etc. The IoT device 110*f* may include a sensor, a smart meter, etc. For example, the base stations 120*a* to 120*e* and the network may be implemented by a wireless device, and the specific wireless device 120*a* may operate as a base station/network node for the other wireless devices.

Here, wireless communication technology implemented in the wireless devices 110*a* to 110*f* of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110*a* to 110*f* of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110*a* to 110*f* of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110*a* to 110*f* may be connected to the network through the base station 120*a* to 120*e*. AI technology is applicable to the wireless devices 110*a* to 110*f*, and the wireless devices 110*a* to 110*f* may be connected to the AI server 110*g* through the network. The network may be configured using a 3G network, a 4G (e.g., LTE) network, a 5G (e.g., NR) network, etc. The wireless devices 110*a* to 110*f* may communicate with each other through the base station 120*a* to 120*e*/network, or may perform direct communication (e.g., sidelink communication) without the base station 120*a* to 120*e*/network. For example, the vehicles 110*b*-1 and 110*b*-2 may perform direct communication (e.g., V2V (vehicle to vehicle)/V2X (vehicle to everything) communication). In addition, the IoT device 110*f* (e.g., a sensor) may perform direct communication with another IoT device (e.g., a sensor) or the other wireless devices 110*a* to 110*f*.

Wireless communication/connection 150*a*, 150*b* or 150*c* may be performed/established between the wireless devices 110*a* to 110*f*/base station 120*a* to 120*e* and the base station 120*a* to 120*e*/base station 120*a* to 120*e*. Here, wireless communication/connection may be performed/established through various radio access technologies (e.g., 5G NR) such as uplink/downlink communication 150*a*, sidelink communication 150*b* (or D2D communication) or BS-to-BS communication 150*c* (e.g., relay or integrated access backhaul (IAB)). The wireless device and the base station/wireless device or the base station and the base station may transmit/receive radio signals to/from each other through wireless communication/network 150*a*, 150*b* or 150*c*. For example, wireless communication/network 150*a*, 150*b* or 150*c* may enable signal transmission/reception through various physical channels. To this end, based on various proposes of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 24:
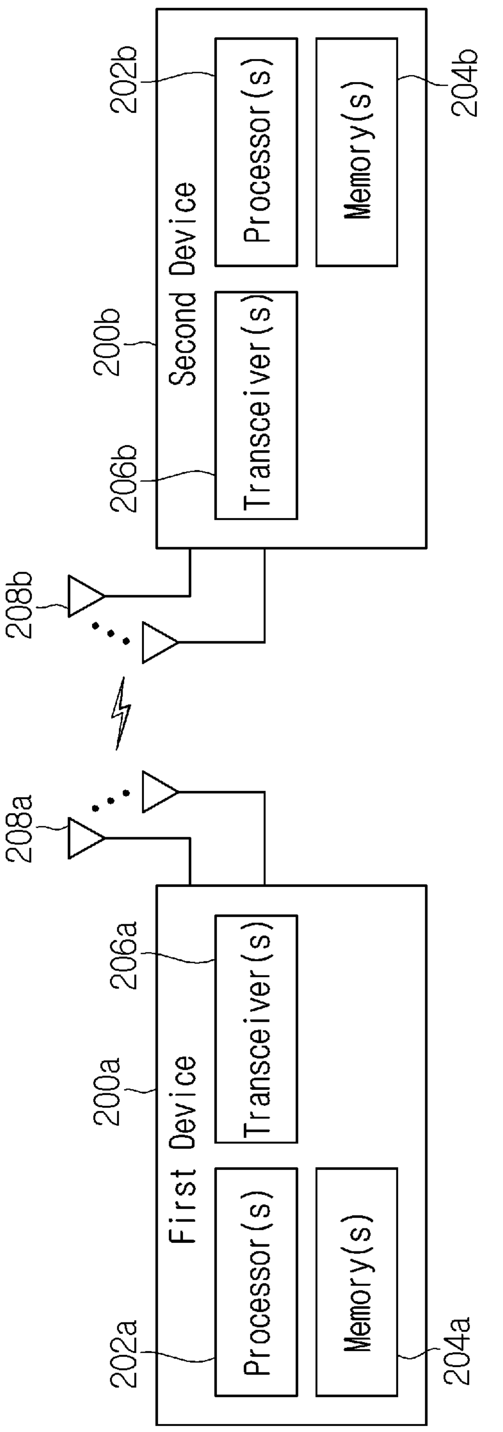
FIG. 24 illustrates an example of a wireless device according to an embodiment of the present disclosure.

FIG. 24 illustrates an example of a wireless device according to an embodiment of the present disclosure.

Referring to FIG. 24, a first wireless device 200*a* and a second wireless device 200*b* may transmit/receive radio signals through various radio access technologies (e.g., LTE or NR). Here, {the first wireless device 200*a* and the second wireless device 200*b*} may correspond to {the wireless device 110*x* and the base station 120*x*} and/or {the wireless device 110*x* and the wireless device 110*x*} of FIG. 1.

The first wireless device 200*a* includes one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement the descriptions, functions, procedures, proposes, methods and/or operation flowcharts disclosed in the present disclosure. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and thus store information obtained from signal processing of the second information/signal in the memory 204*a*. The memory 204*a* may be connected to the processor 202*a* to store a variety of information related to operation of the processor 202*a*. For example, the memory 204*a* may perform some or all of the processes controlled by the processor 202*a* or store software code including commands for performing the descriptions, functions, procedures, proposes, methods and/or operation flowcharts disclosed in the present disclosure. Here, the processor 202*a* and the memory 204*a* may be a portion of a communication modem/circuit/chip designed to implement wireless communication technology (e.g., LTE or NR). The transceiver 206*a* may be connected to the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may mean a communication modem/circuit/chip.

The second wireless device 200*b* performs wireless communication with the first wireless device 200*a*, includes one or more processors 202*b* and one or more memories 204*b* and may further include one or more transceivers 206*b* and/or one or more antennas 208*b*. The functions of the one or more processors 202*b*, the one or more memories 204*b*, the one or more transceivers 206*b* and/or the one or more antennas 208*b* are similar to those of the one or more processors 202*a*, the one or more memories 204*a*, the one or more transceivers 206*a* and/or the one or more antennas 208*a* of the first wireless device 200*a*.

Hereinafter, the hardware elements of the wireless devices 200*a* and 200*b* will be described in greater detail. Although not limited thereto, one or more protocol layers may be implemented by one or more processors 202*a* and 202*b*. For example, the one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202*a* and 202*b* may generate one or more protocol data units (PDUs), one or more service data units (SDUs), messages, control information, data or information according to the descriptions, functions, procedures, proposes, methods and/or operation flowcharts disclosed in the present disclosure. The one or more processors 202*a* and 202*b* may generate and provide signals (e.g., baseband signals) including the PDUs, the SDUs, the messages, the control information, the data or the information to the one or more transceivers 206*a* and 206*b* according to the functions, procedures, proposes and/or methods disclosed in the present disclosure. The one or more processors 202*a* and 202*b* may receive signals (e.g., baseband signals) from one or more transceivers 206*a* and 206*b* to obtain the PDUs, the SDUs, the messages, the control information, the data or the information according to the descriptions, functions, procedures, proposes, methods and/or operation flowcharts disclosed in the present disclosure.

The one or more processors 202*a* and 202*b* may be referred to as controllers, microcontrollers or microcomputers. The one or more processors 202*a* and 202*b* may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202*a* and 202*b*. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202*a* and 202*b* or stored in the one or more memories 204*a* and 204*b* and driven by the one or more processors 202*a* and 202*b*. The descriptions, functions, procedures, proposes, methods and/or operation flowcharts disclosed in the present disclosure may be implemented using firmware or software in the form of code, a command and/or a set of commands.

The one or more memories 204*a* and 204*b* may be connected to the one or more processors 202*a* and 202*b* to store various types of data, signals, messages, information, programs, code, instructions and/or commands. The one or more memories 204*a* and 204*b* may include a ROM (read only memory), a RAM (random access memory), an EPROM (erasable programmable read only memory), a flash memory, a hard drive, a register, a cache memory, a computer-readable storage medium and/or a combination thereof. The one or more memories 204*a* and 204*b* may be located inside and/or outside the one or more processors 202*a* and 202*b*. In addition, the one or more memories 204*a* and 204*b* may be connected to the one or more processors 202*a* and 202*b* through various technologies such as wired or wireless connection.

The one or more transceivers 206*a* and 206*b* may transmit, to one or more other devices, user data, control information, radio signals/channels, etc. described in the methods and/or operation flowcharts of the present disclosure. The one or more transceivers 206*a* and 206*b* may receive, from one or more other devices, user data, control information, radio signals/channels, etc. described in the descriptions, functions, procedures, proposes, methods and/or operation flowcharts disclosed in the present disclosure. In addition, the one or more transceivers 206*a* and 206*b* may be connected to the one or more antennas 208*a* and 208*b* and may be configured to transmit/receive user data, control information, radio signals/channels, etc. described in the descriptions, functions, procedures, proposes, methods and/or operation flowcharts disclosed in the present disclosure through the one or more antennas 208*a* and 208*b*. In the present disclosure, one or more antennas may be a plurality of physical antennas or a plurality of logical antennas (e.g., antenna ports). The one or more transceivers 206*a* and 206*b* may convert the received radio signals/channels, etc. from RF band signals to the baseband signals, in order to process the received user data, control information, radio signals/channels, etc. using the one or more processors 202*a* and 202*b*. The one or more transceivers 206*a* and 206*b* may convert the user data, control information, radio signals/channels, etc. processed using the one or more processors 202*a* and 202*b* from a baseband signal to an RF band signal. To this end, the one or more transceivers 206*a* and 206*b* may include an (analog) oscillator and/or a filter.

Figure 25:
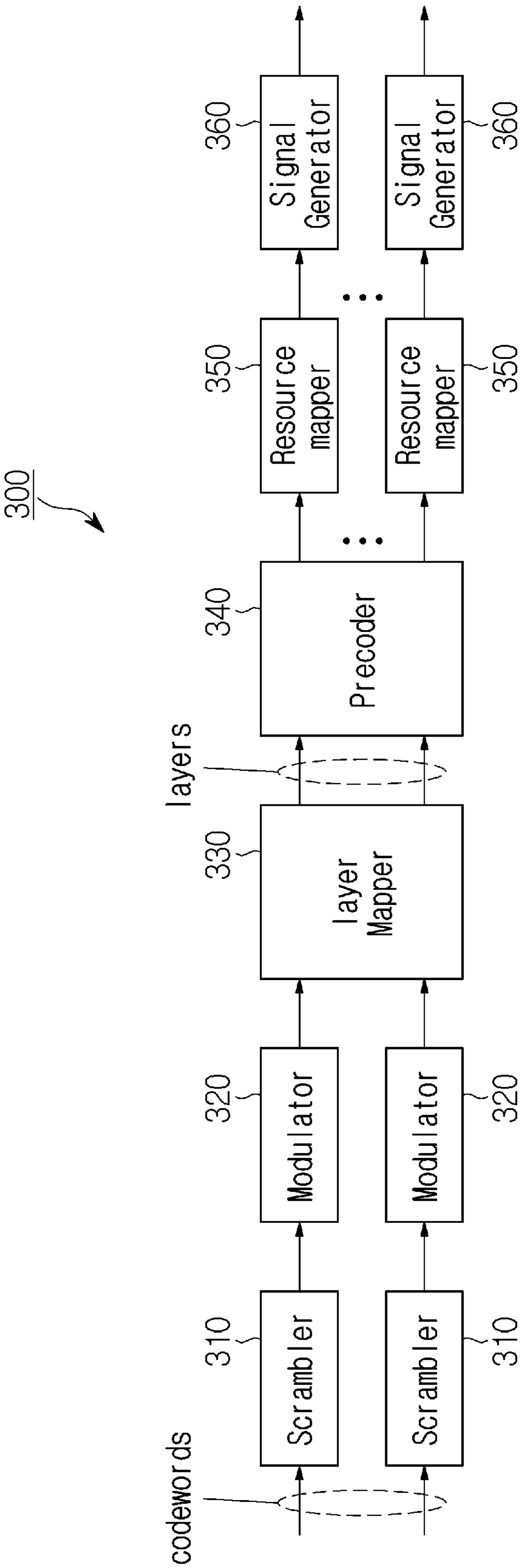
FIG. 25 illustrates a circuit for processing a transmitted signal according to an embodiment of the present disclosure.

FIG. 25 illustrates a circuit for processing a transmitted signal according to an embodiment of the present disclosure. The embodiment of FIG. 25 may be combined with various embodiments of the present disclosure.

Referring to FIG. 25, a signal processing circuit 300 may include a scrambler 310, a modulator 320, a layer mapper 330, a precoder 340, a resource mapper 350 and a signal generator 360. In this case, for example, the operation/function of FIG. 25 may be performed by the processors 202*a* and 202*b* and/or the transceivers 206*a* and 206*b* of FIG. 24. In addition, for example, the hardware element of FIG. 25 may be implemented in the processors 202*a* and 202*b* and/or the transceivers 206*a* and 206*b* of FIG. 24. For example, blocks 310 to 360 may be implemented in the processors 202*a* and 202*b* of FIG. 24. Alternatively, the blocks 310 to 350 may be implemented in the processors 202*a* and 202*b* of FIG. 24 and the block 360 may be implemented in the transceivers 206*a* and 206*b* of FIG. 24, without being limited to the above-described embodiment.

The codeword may be converted into a radio signal through the signal processing circuit 300 of FIG. 25. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 25. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK (pi/2-binary phase shift keying), m-PSK (m-phase shift keying), m-QAM (m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT) with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 25. For example, the wireless device (e.g., 200*a* and 200*b* of FIG. 24) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a descrambler and a decoder.

Figure 26:
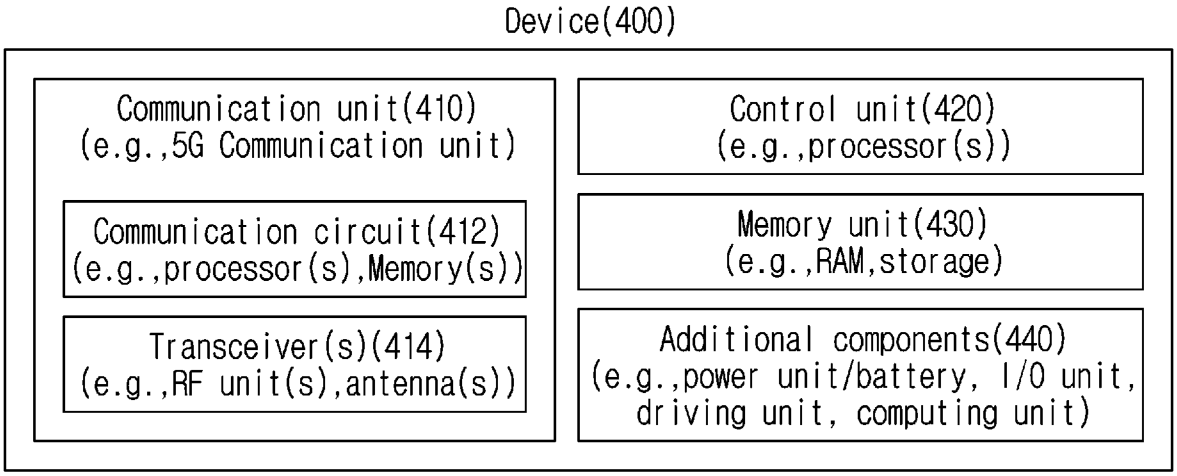
FIG. 26 illustrates another example of a wireless device according to an embodiment of the present disclosure.

FIG. 26 illustrates another example of a wireless device according to an embodiment of the present disclosure. The embodiment of FIG. 26 may be combined with various embodiments of the present disclosure.

Referring to FIG. 26, the wireless device 300 corresponds to the wireless devices 200*a* and 200*b* of FIG. 24 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202*a* and 202*b* and/or the one or more memories 204*a* and 204*b* of FIG. 24. For example, the transceiver(s) 414 may include the one or more transceivers 206*a* and 206*b* and/or the one or more antennas 208*a* and 208*b* of FIG. 24.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110*a*), a vehicle (FIGS. 1, 110*b*-1 and 110*b*-2), an XR device (FIG. 1, 110*c*), a hand-held device (FIG. 1, 110*d*), a home appliance (FIG. 1, 110*e*), an IoT device (FIG. 1, 110*f*), a digital broadcast terminal, a hologram device, a public safety device, an MTC device, a medical device, a Fintech device (or a financial device), a security device, a climate/environment device, an AI server/device (FIG. 1, 140), or a network node. The wireless device is movable or may be used at a fixed place according to the use example/service.

Figure 27:
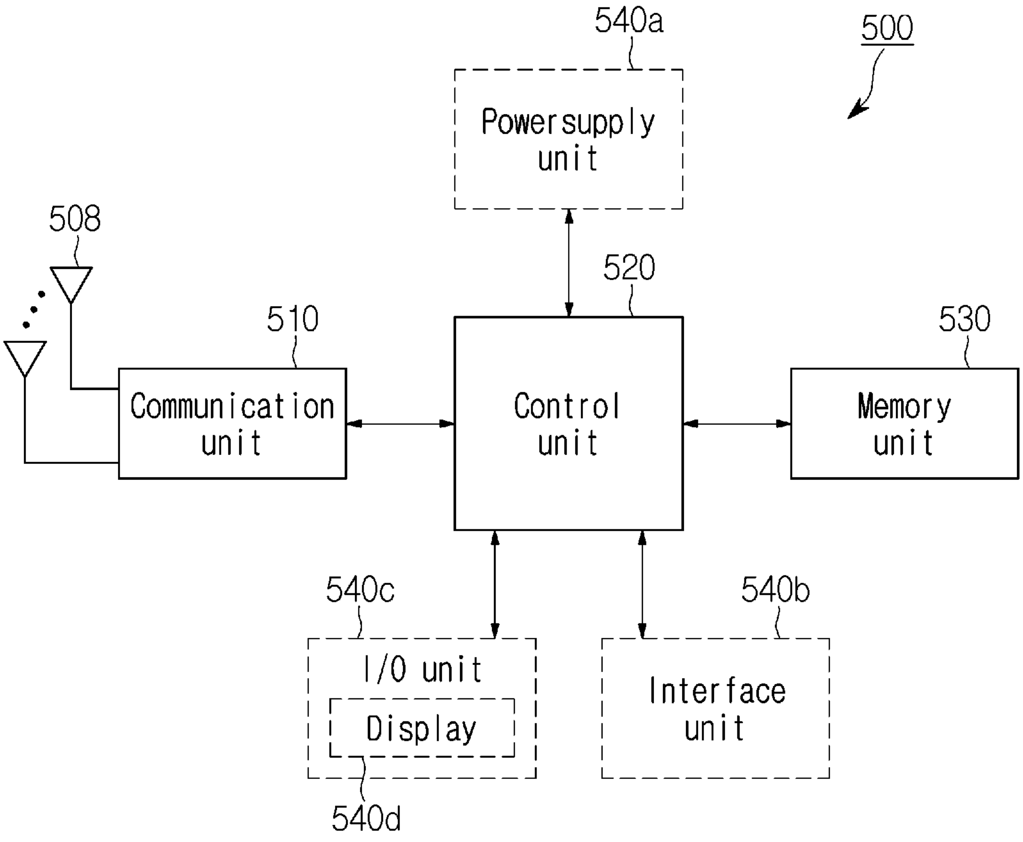
FIG. 27 illustrates an example of a hand-held device according to an embodiment of the present disclosure.

FIG. 27 illustrates an example of a hand-held device according to an embodiment of the present disclosure. FIG. 27 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 27 may be combined with various embodiments of the present disclosure.

Referring to FIG. 27, the hand-held device 500 may include an antenna unit 508, a communication unit 510, a control unit 530, a power supply unit 540*a*, an interface unit 540*b* and an input/output unit 540*c*. The antenna unit 508 may be a portion of the communication unit 510. Blocks 510 to 530/540*a* to 540*c* may respectively correspond to the blocks 410 to 430/440 of FIG. 26 and a repeated description thereof will be omitted.

The communication unit 510 may transmit and receive signals, the control unit 520 may control the hand-held device 500, and the memory unit 530 may store data, etc. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output image video information/signals, audio information/signals, data and/or information received from a user. The input/output unit 540*c* may include a camera, a microphone, a user input unit, a display 540*d*, a speaker and/or a haptic module.

For example, in the case of data communication, the input/output unit 540*c* may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540*c* in various forms (e.g., text, voice, image, video or haptic).

Figure 28:
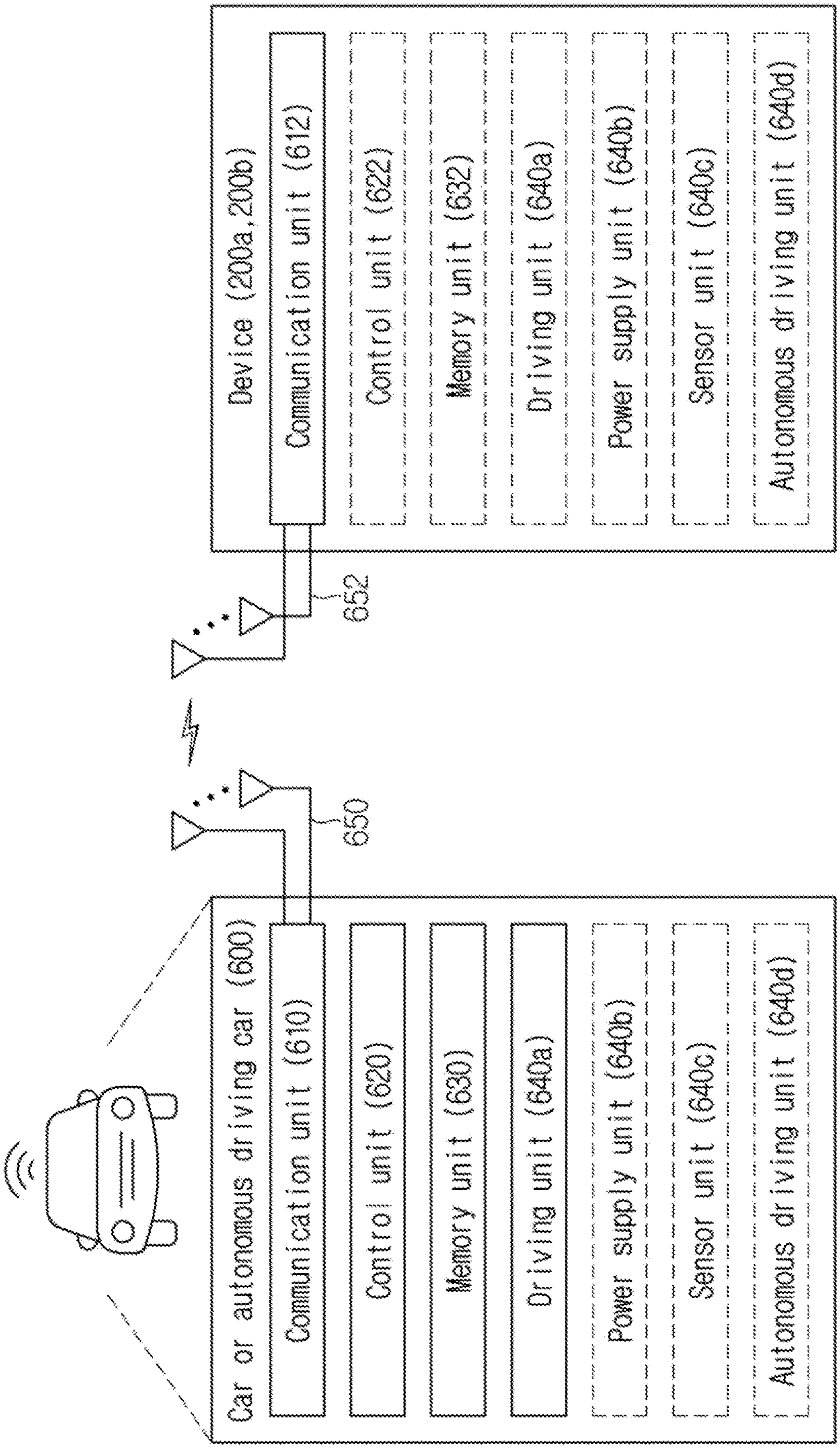
FIG. 28 illustrates an example of a vehicle or an autonomous vehicle according to an embodiment of the present disclosure.

FIG. 28 illustrates an example of a vehicle or an autonomous vehicle according to an embodiment of the present disclosure. FIG. 28 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 28 may be combined with various embodiments of the present disclosure.

Referring to FIG. 28, a vehicle or autonomous vehicle 600 may include an antenna unit 608, a communication unit 610, a control unit 620, a driving unit 640*a*, a power supply unit 640*b*, a sensor unit 640*c*, and an autonomous driving unit 640*d*. The antenna unit 608 may be configured as a part of the communication unit 610. The blocks 610/630/640*a*~640*d* correspond to the blocks 510/530/540 of FIG. 27, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640*a* may cause the vehicle or the autonomous vehicle 600 to drive on a road. The driving unit 640*a* may include an engine, a motor, a powertrain, a wheel, a brake, a steering device, etc. The power supply unit 640*b* may supply power to the vehicle or the autonomous vehicle 600 and include a wired/wireless charging circuit, a battery, etc. The sensor unit 640*c* may obtain a vehicle state, ambient environment information, user information, etc. The sensor unit 640*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640*d* may generate an autonomous driving path and a driving plan from the obtained data. The control unit 620 may control the driving unit 640*a* such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640*c* may obtain a vehicle state and/or surrounding environment information. The autonomous driving unit 640*d* may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method performed by a terminal in a wireless communication system, the method comprising:
- generating a first signal at a transmitting end of the terminal;
- transmitting the first signal through an antenna;
- receiving a second signal through the antenna; and
- transferring the second signal to a receiving end of the terminal,
- wherein the first signal and the second signal pass through a differential circulator within a time interval, and
- wherein the differential circulator comprises two double pole double throw (DPDT) switches, two single pole double throw (SPDT) switches and at least one sequentially switched delay line (SSDL).

2. The method of claim 1, wherein the first signal is transferred to each of the two DPDT switches.

3. The method of claim 1, wherein the at least one SSDL is configured between the two DPDT switches and the two SPDT switches.

4. The method of claim 3, wherein the at least one SSDL is configured based on a magnetically coupled inductor.

5. The method of claim 4, wherein each of the two DPDT switches comprises two input terminals and two output terminals, and
- wherein the two input terminals of each of the two DPDT switches are respectively connected to the transmitting end and the receiving end, and the two output terminals of each of the two DPDT switches are connected to the at least one SSDL configured based on the magnetically coupled inductor.

6. The method of claim 5, wherein each of the two SPDT switches comprises one input terminal and two output terminals,
- wherein the two output terminals of each of the two SPDT switches are connected to the at least one SSDL configured based on the magnetically coupled inductor, and
- wherein the input terminal of each of the two SPDT switches is connected to the antenna.

7. The method of claim 6, wherein each of the two SPDT switches is switched from a first output terminal to a second output terminal at a first timing.

8. The method of claim 7, wherein each of the two input terminals of each of the two DPDT switches is switched from a first input terminal to a second input terminal at a second timing later than the first timing.

9. The method of claim 8, wherein each of the two SPDT switches is switched from the second output terminal to the first output terminal at a third timing later than the second timing.

10. The method of claim 9, wherein each of the two input terminals of each of the two DPDT switches is switched from the second input terminal to the first input terminal at a fourth timing later than the third timing.

11. The method of claim 4,
- wherein the first signal generated at the transmitting end is generated based on a first frequency, and
- wherein the first signal based on the first frequency passes through the two DPDT switches and then passes through the at least one SSDL based on a signal with a mixed frequency component, and when the signal with the mixed frequency component passes through the two SPDP switches, the first signal based on the first frequency is restored.

12. The method of claim 4,
- wherein the at least one SSDL configured based on the magnetically coupled inductor comprises a direct capacitor and a cross capacitor, and
- wherein the direct capacitor has a frequency at which a delay of a delay line increases, and the cross capacitor has a frequency at which the delay of the delay line decreases.

13. A terminal in a wireless communication system, the terminal comprising:
- a transceiver; and
- a processor connected to the transceiver,
- wherein the processor is configured to:
- generate a first signal at a transmitting end of the terminal;
- transmit the first signal through an antenna;
- receive a second signal through the antenna; and
- transfer the second signal to a receiving end of the terminal,
- wherein the first signal and the second signal pass through a differential circulator within a time interval, and
- wherein the differential circulator comprises two double pole double throw (DPDT) switches, two single pole double throw (SPDT) switches and at least one sequentially switched delay line (SSDL).

14. A base station in a wireless communication system, the base station comprising:
- a transceiver; and a processor connected to the transceiver,
wherein the processor is configured to:
generate a first signal at a transmitting end of the base station,
transmit the first signal through an antenna,
receive a second signal through the antenna, and
transfer the second signal to a receiving end of the base station,
wherein the first signal and the second signal pass through a differential circulator within a time interval, and
wherein the differential circulator comprises two double pole double throw (DPDT) switches, two single pole double throw (SPDT) switches and at least one sequentially switched delay line (SSDL).

* * * * *